US012525205B2

(12) United States Patent
Zhao et al.

(10) Patent No.: US 12,525,205 B2
(45) Date of Patent: Jan. 13, 2026

(54) PIXEL DRIVING METHOD, PIXEL DRIVING CIRCUIT AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Jing Zhao, Beijing (CN); Feng Long, Beijing (CN); Meng Shi, Beijing (CN); Yujie Liu, Beijing (CN); Xiuyun Chen, Beijing (CN); Guangquan Wang, Beijing (CN); Jiantao Liu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 48 days.

(21) Appl. No.: 18/573,227

(22) PCT Filed: Aug. 9, 2022

(86) PCT No.: PCT/CN2022/111094

§ 371 (c)(1),
(2) Date: Dec. 21, 2023

(87) PCT Pub. No.: WO2024/031319

PCT Pub. Date: Feb. 15, 2024

(65) Prior Publication Data

US 2025/0095603 A1 Mar. 20, 2025

(51) Int. Cl.
*G09G 3/36* (2006.01)

(52) U.S. Cl.
CPC ..... *G09G 3/3696* (2013.01); *G09G 2310/027* (2013.01); *G09G 2310/0291* (2013.01);
(Continued)

(58) Field of Classification Search
CPC .......... G09G 3/3696; G09G 2310/027; G09G 2310/0291; G09G 2320/0626;
(Continued)

(56) References Cited

U.S. PATENT DOCUMENTS

2013/0328797 A1* 12/2013 Al-Dahle .............. G06F 1/3262 345/173
2016/0238851 A1 8/2016 Jeong et al.
(Continued)

FOREIGN PATENT DOCUMENTS

CN 101034532 A 9/2007
CN 107403611 A 11/2017
(Continued)

OTHER PUBLICATIONS

International Search Report received for PCT Patent Application No. PCT/CN2022/111094, mailed on Apr. 28, 2023, 5 pages (2 pages of English Translation and 3 pages of Original Document).
(Continued)

*Primary Examiner* — Sahlu Okebato
(74) *Attorney, Agent, or Firm* — Calfee, Halter & Griswold LLP

(57) ABSTRACT

The disclosure provides a pixel driving method, a pixel driving circuit and a display device. The pixel driving method includes: receiving image data; determining a data voltage signal for a target pixel based on pixel data for the target pixel in the image data; in response to a first enable signal being valid, driving the target pixel in a first display mode, in which the data voltage signal is updated at a first frequency and the data voltage signal is provided for the target pixel so that a driving voltage of the target pixel is determined as a voltage difference between the data voltage signal and a common voltage signal; in response to a second enable signal being valid, driving the target pixel in a second
(Continued)

display mode, in which the data voltage signal is updated at a second frequency, and the data voltage signal is adjusted according to the pixel data for the target pixel, so that the driving voltage of the target pixel is determined as a maximum driving voltage or a minimum driving voltage, wherein the second frequency is lower than the first frequency.

23 Claims, 28 Drawing Sheets

(52) U.S. Cl.
CPC ............... *G09G 2320/0626* (2013.01); *G09G 2320/0673* (2013.01); *G09G 2330/021* (2013.01)

(58) Field of Classification Search
CPC ..... G09G 2320/0673; G09G 2330/021; G09G 3/3208; G09G 3/36
See application file for complete search history.

(56) References Cited

U.S. PATENT DOCUMENTS

| | | | | |
|---|---|---|---|---|
| 2019/0096354 | A1 | 3/2019 | Chen et al. | |
| 2019/0392761 | A1* | 12/2019 | Huang | G09G 3/3258 |
| 2020/0160769 | A1 | 5/2020 | Fu et al. | |
| 2021/0043150 | A1* | 2/2021 | Lee | G09G 3/3291 |
| 2022/0051599 | A1 | 2/2022 | Kang et al. | |
| 2022/0051611 | A1* | 2/2022 | Yin | G09G 3/3225 |
| 2022/0301515 | A1 | 9/2022 | Wang et al. | |
| 2023/0298524 | A1* | 9/2023 | Cho | G09G 3/3233 345/691 |

FOREIGN PATENT DOCUMENTS

| | | | |
|---|---|---|---|
| CN | 107767809 | A | 3/2018 |
| CN | 108648702 | A | 10/2018 |
| CN | 109473079 | A | 3/2019 |
| CN | 110085173 | A | 8/2019 |
| CN | 111276177 | A | 6/2020 |
| CN | 111312161 | A | 6/2020 |
| CN | 112967653 | A | 6/2021 |
| CN | 114078407 | A | 2/2022 |
| KR | 10-2016-0099338 | A | 8/2016 |
| WO | 2020000866 | A1 | 1/2020 |

OTHER PUBLICATIONS

First Office Action of Chinese patent application No. 202280002588.7 dated Jun. 13, 2025.

* cited by examiner

700C

800C

800D

1000

1100

1500

| Interface | | 60 Hz operation mode | | | 1 Hz operation mode | |
|---|---|---|---|---|---|---|
| | | Data format | Support condition | Note | Data format | Support condition |
| MIPI | VIDEO &CMD mode | 6-6-6 | Support Recommended | Brightness 100% | 1-1-1 | Support Recommended |
| | | 5-6-5 | Support Recommended | Brightness 100% | | |
| SPI4W | CMD mode | 6-6-6 | Support Recommended | Brightness 100% By theoretical calculation, mainboard SCL need to meet: 6-6-6, ≥77MHz; 5-6-5, ≥52MHz; or image refreshment lags | 1-1-1 | Support Recommended |
| | | 5-6-5 | Support Recommended | | | |
| | | 2-2-2+Idle 8-colors data | Support Use conditionally | Brightness 100% 8-color film source, require mainboard to support to send 3-bit data in 2-2-2 format | | |
| | | 1-1-1+Gamma | Support Use conditionally | Brightness 80% | | |
| | | 2-2-2 | Support Not recommended | Brightness 60% | | |
| | | 1-1-1 | Support Not recommended | Brightness 60% | | |

Fig. 15

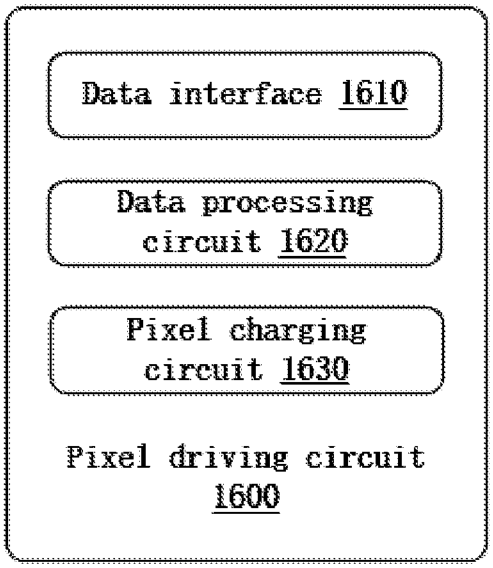

Fig. 16

PIXEL DRIVING METHOD, PIXEL DRIVING CIRCUIT AND DISPLAY DEVICE

CROSS REFERENCE TO RELATED APPLICATIONS

The present application is a 35 U.S.C. 371 national stage application of a PCT International Application No. PCT/CN2022/111094, filed on Aug. 9, 2022, the contents of which are incorporated herein by reference in their entireties.

TECHNICAL FIELD

The present disclosure relates to the technical field of display, in particular to a pixel driving method, a pixel driving circuit and a display device.

BACKGROUND

For the battery-powered computing devices, such as wearable devices, mobile phones, tablets, and etc., it is generally necessary to maintain longer endurance time by charging or replacing batteries. Therefore, there is usually a need to reduce power consumption and to extend endurance time for such devices. Especially, for wearable devices such as smart watches, because of the small size, it is difficult for them to carry large-capacity batteries, the need in power consumption reduction may be more urgent for these devices.

SUMMARY

In view of this, the present disclosure provides a pixel driving method, a pixel driving circuit, a display device and a computing device, which may mitigate, alleviate or even eliminate the above problems.

According to an aspect of the present disclosure, there is provided a pixel driving method, which includes receiving image data including pixel data for at least one pixel; determining a data voltage signal for a target pixel based on pixel data for the target pixel in the image data; in response to a first enable signal being valid, driving the target pixel in a first display mode, in which operations are performed which include updating the data voltage signal at a first frequency and providing the data voltage signal for the target pixel so that a driving voltage of the target pixel is determined as a voltage difference between the data voltage signal and a common voltage signal, wherein the common voltage signal is a reference voltage signal common to all pixels; in response to a second enable signal being valid, driving the target pixel in a second display mode, in which operations are performed which include updating the data voltage signal at a second frequency, adjusting the data voltage signal according to the pixel data for the target pixel, and providing the adjusted data voltage signal for the target pixel so that the driving voltage of the target pixel is determined as a maximum driving voltage or a minimum driving voltage, wherein the second frequency is lower than the first frequency.

In some embodiments, the pixel data for the target pixel includes at least one significant data bit, and wherein the adjusting the data voltage signal according to the pixel data for the target pixel, and providing the adjusted data voltage signal for the target pixel so that the driving voltage of the target pixel is determined as a maximum driving voltage or a minimum driving voltage includes: in response to a most significant data bit in the at least one significant data bit being a first value, adjusting the data voltage signal so that the driving voltage of the target pixel is determined as the maximum driving voltage; in response to the most significant data bit in the at least one significant data bit being a second value, adjusting the data voltage signal so that the driving voltage of the target pixel is determined as the minimum driving voltage.

In some embodiments, the adjusting the data voltage signal so that the driving voltage of the target pixel is determined as the maximum driving voltage includes: during an initialization period, determining the data voltage signal as a first voltage signal and providing valid initialization control signals for pixels in turn; during a display period, determining the data voltage signal as opposite to the common voltage signal, and providing a continuously valid display control signal for the target pixel, so that the driving voltage of the target pixel is determined as a voltage difference between the data voltage signal and the common voltage signal.

In some embodiments, the adjusting the data voltage signal so that the driving voltage of the target pixel is determined as the minimum driving voltage includes: during an initialization period, determining the data voltage signal as a second voltage signal, and providing valid initialization control signals for pixels in turn; during a display period, providing a zero-difference voltage signal for the target pixel, wherein the zero-difference voltage signal is the same as the common voltage signal, and providing a continuously valid display control signal for the target pixel, so that the driving voltage of the target pixel is determined as a voltage difference between the zero-difference voltage signal and the common voltage signal.

In some embodiments, the determining a data voltage signal for a target pixel based on pixel data for the target pixel in the image data includes: buffering pixel data for a preset number of pixels in the image data; according to a preset digital-to-analog conversion rule, converting the pixel data for the target pixel in the buffered pixel data into the data voltage signal for the target pixel.

In some embodiments, the buffering pixel data for a preset number of pixels in the image data includes: in response to a number of significant data bits in the pixel data for the preset number of pixels being greater than a first threshold, compressing the pixel data for the preset number of pixels according to a preset compression rule so that a number of significant data bits in the compressed pixel data is not greater than the first threshold.

In some embodiments, converting the pixel data for the target pixel in the buffered pixel data into the data voltage signal for the target pixel includes: decompressing the compressed pixel data; converting the pixel data for the target pixel in the decompressed pixel data into the data voltage signal for the target pixel.

In some embodiments, the buffering pixel data for a preset number of pixels in the image data includes: in response to a number of significant data bits in the pixel data for the preset number of pixels being less than a first threshold, complementing the pixel data for the preset number of pixels according to a first preset bit complement rule, so that a number of significant data bits in the complemented pixel data is equal to the first threshold.

In some embodiments, the converting the pixel data for the target pixel in the buffered pixel data into the data voltage signal for the target pixel includes: in response to a number of significant data bits in pixel data for a target pixel electrode being less than a second threshold, complementing the pixel data for the target pixel electrode according to a second preset bit complement rule, so that a number of significant data bits in the complemented pixel data is equal to the second threshold.

In some embodiments, the converting the pixel data for the target pixel in the buffered pixel data into the data voltage signal for the target pixel further includes: in response to receiving pixel data for at least two pixels every clock cycle, redistributing the pixel data for the at least two pixels into at least two groups of pixel data for different pixels.

In some embodiments, the pixel driving method further includes: in the first display mode, in response to receiving an instruction to switch to the second display mode, writing enabling data for the second display mode into a mode register, and after a first preset time interval, making the second enable signal valid based on the enabling data in the mode register.

In some embodiments, the pixel driving method further includes: in the second display mode, in response to receiving new image data, opening a data voltage buffer; writing a data voltage signal determined based on the new image data into the data voltage buffer; closing the data voltage buffer after a second preset time interval.

In some embodiments, the pixel driving method further includes: in the second display mode, in response to receiving an instruction to switch to the first display mode, writing enabling data for the first display mode into a mode register and opening a data voltage buffer; writing a data voltage signal into the data voltage buffer; closing the data voltage buffer after a third preset time interval; making the first enable signal valid based on the enabling data in the mode register.

In some embodiments, the pixel driving method further includes: in the first display mode, when a number of significant data bits in the pixel data for the target pixel meets a first preset condition, in response to receiving an enable signal for a low-quality display mode, using the low-quality display mode, wherein in the low-quality display mode, in response to the most significant data bit in the pixel data for the target pixel being a first value, setting the pixel data for the target pixel as a maximum value, and, in response to the most significant data bit in the pixel data for the target pixel being a second value, setting the pixel data for the target pixel as a minimum value.

In some embodiments, the pixel driving method further includes: in the first display mode, when a number of significant data bits in the pixel data for the target pixel meets a second preset condition, making the second enable signal valid before the screen is lit.

In some embodiments, the pixel driving method further includes: in the first display mode, when a number of significant data bits in the pixel data for the target pixel meets a third preset condition, adjusting the data voltage signal for the target pixel according to a preset binding point voltage, wherein the preset binding point voltage is used for specifying the data voltage signal corresponding to at least one gray scale.

In some embodiments, the receiving image data includes: after the device is powered on and initialized, and before the screen is lit, receiving initialization image data, and determining initialization voltage signals for pixels based on the initialization image data.

In some embodiments, the receiving image data includes: according to a preset interface rule, selecting a first interface or a second interface to receive the image data based on the display mode and/or the number of significant data bits in the pixel data, wherein the first interface and the second interface have different data transmission rates.

According to another aspect of the present disclosure, there is provided a pixel driving circuit including a data interface configured to receive image data including pixel data for at least one pixel; a data processing circuit configured to determine a data voltage signal for a target pixel based on pixel data for the target pixel in the image data; a pixel electrode driving circuit comprises a first charging circuit and a second charging circuit, wherein the first charging circuit is configured to, in response to a first enable signal being valid, drive the target pixel in a first display mode, in which operations are performed which comprise updating the data voltage signal at a first frequency, and providing the data voltage signal for the target pixel so that a driving voltage of the target pixel is determined as a voltage difference between the data voltage signal and a common voltage signal, wherein the common voltage signal is a reference voltage signal common to all pixels, and wherein the second charging circuit is configured to, in response to a second enable signal being valid, drive the target pixel in a second display mode, in which operations are performed which comprise updating the data voltage signal at a second frequency, adjusting the data voltage signal according to pixel data for the target pixel, and providing the adjusted data voltage signal for the target pixel so that a driving voltage of the target pixel is determined as a maximum driving voltage or a minimum driving voltage, wherein the second frequency is lower than the first frequency.

In some embodiments, the pixel data for the target pixel comprises at least one significant data bit, and wherein the second charging circuit comprises: a latch configured to latch a most significant data bit in the at least one significant data bit; a mode selection circuit configured to, in response to the most significant data bit in the at least one significant data bit being a first value, adjust the data voltage signal so that a driving voltage of the target pixel is determined as the maximum driving voltage, and, in response to the most significant data bit in the at least one significant data bit being a second value, adjust the data voltage signal so that the driving voltage of the target pixel is determined as the minimum driving voltage.

In some embodiments, the data processing circuit comprises: a buffer circuit configured to buffer pixel data for a preset number of pixels in the image data; a digital-to-analog conversion circuit configured to convert pixel data for the target pixel in the buffered pixel data into the data voltage signal for the target pixel.

In some embodiments, the pixel driving circuit further includes: a data voltage buffer configured to buffer the data voltage signal in the second display mode.

According to yet another aspect of the present disclosure, there is provided a display device including the pixel driving circuit described in the foregoing aspects; a liquid crystal panel including a plurality of pixels and configured to receive data voltage signals from the pixel driving circuit; a backlight plate configured to provide backlight for the liquid crystal panel.

These and other aspects of the present disclosure will be apparent from and elucidated with reference to the embodiments described hereinafter.

BRIEF DESCRIPTION OF THE DRAWINGS

Further details, features and advantages of the present disclosure are disclosed in the following description of exemplary embodiments, which are described in conjunction with the accompanying drawings, in which:

FIG. 15 schematically illustrates an exemplary table of recommended interface configurations according to some embodiments of the present disclosure;

FIG. 16 schematically illustrates an exemplary block diagram of a pixel driving circuit according to some embodiments of the present disclosure;

DETAILED DESCRIPTION

Figure 1:
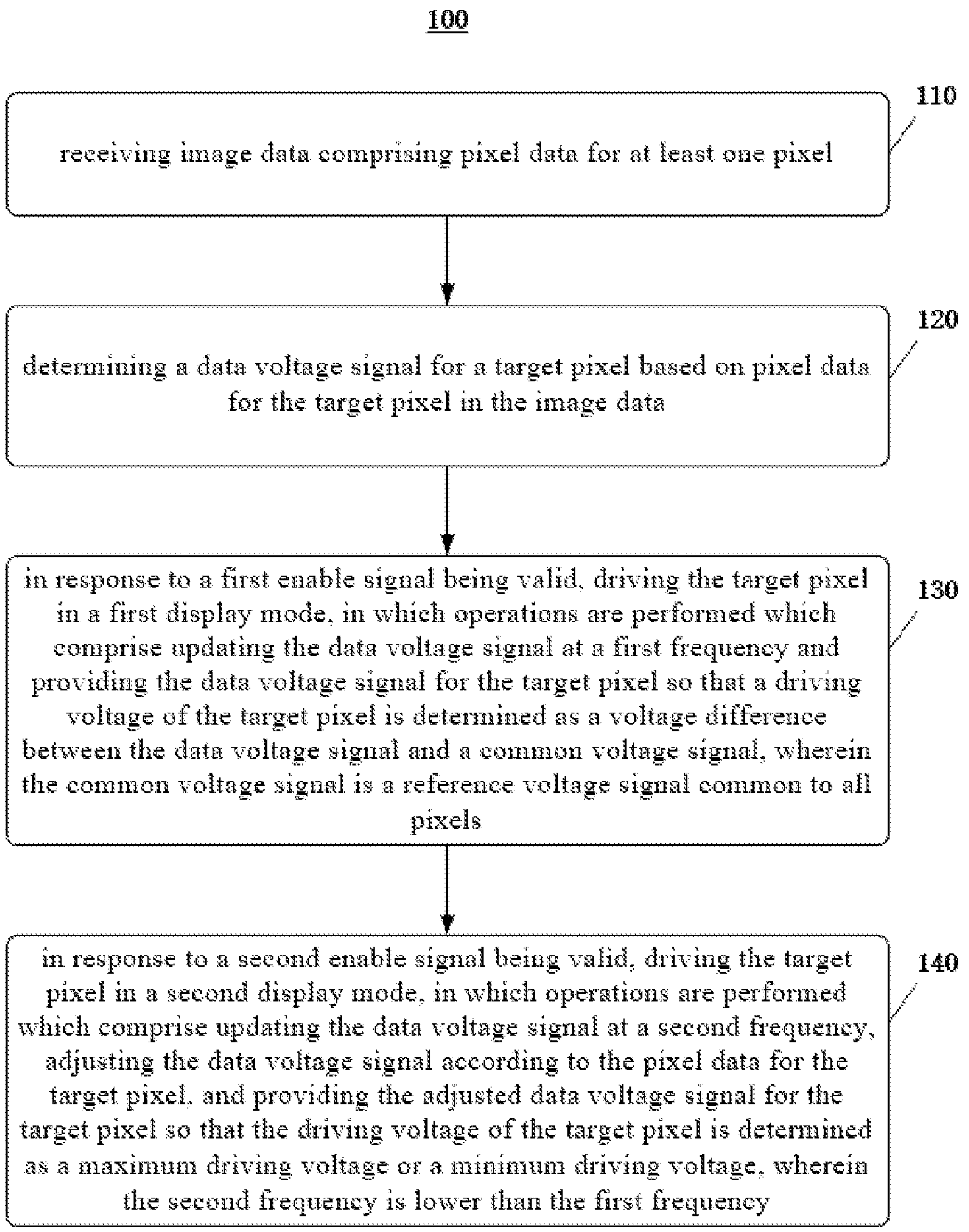
FIG. 1 schematically illustrates an exemplary flowchart of a pixel driving method according to some embodiments of the present disclosure.

In the following, the technical solutions in embodiments of the present disclosure will be described clearly and completely with the attached drawings. It should be understood that the described embodiments are only part of the embodiments of the present disclosure, and not all of the embodiments. Based on the embodiments described in the present disclosure, all other embodiments obtained by those of ordinary skills in the art without creative work pertain to the protection scope of the disclosure. It will be understood by those skilled in the art that the embodiments described below are intended to explain the present disclosure and should not be regarded as limiting the present disclosure. Unless otherwise specified, if the specific technology or condition is not explicitly described in the following embodiments, those skilled in the art may understand them according to the technology or condition commonly used in the art or according to the product specification.

In the description of this specification, descriptions referring to the terms "one embodiment", "another embodiment" and etc. mean that a specific feature, structure, material or characteristic described in connection with the embodiment is included in at least one embodiment of the present disclosure. In this specification, the schematic expressions of the above terms are not necessarily for the same embodiment or example. Moreover, the specific features, structures, materials or characteristics described may be combined in any one or more embodiments or examples in suitable manners. In addition, without contradiction, those skilled in the art may combine the different embodiments or examples described in the description or combine the features of different embodiments or examples. In addition, it should be noted that in the specification, the terms "first", "second" and etc. are only used for descriptive purposes, and cannot be understood as indicating or implying relative importance or implicitly indicating the number of indicated technical features.

As will be understood by those skilled in the art, although the steps of the method in the present disclosure are described in a specific order in the drawings, it does not require or imply that the steps must be performed in the specific order unless indicated clearly otherwise. Additionally or alternatively, multiple steps may be combined into one step for execution, and/or one step may be decomposed into multiple steps for execution. In addition, other method steps may be inserted between steps. The inserted steps may represent an improvement of the method as described herein, or may be irrelevant to the method. Furthermore, a given step may not be completely completed before the next step begins.

FIG. 1 schematically illustrates an exemplary flowchart of a pixel driving method 100 according to some embodiments of the present disclosure. As shown in FIG. 1, the pixel driving method 100 may include steps 110 to 140. Exemplarily, the pixel driving method 100 may be performed by a computing device including a display screen, for example, by a driving means for driving the display screen in the computing device, and the driving means may be embodied as a circuit structure that is independent to or integrated with other means, and may or may not have a separate packaging structure. For example, the driving means may be implemented as a structure such as an integrated circuit (IC) for driving. Generally, the driving means may be used to receive image data from the system side and provide driving signals for some or all of the pixels in the display screen based on the image data to display corresponding images. The system side may refer to means such as a central control unit (CPU), a microcontroller unit (MCU) or a dedicated graphics processing unit (GPU), which may transmit image data to the driving means according to preset data formats and corresponding transmission protocols based on stored images, received images or generated images. Steps 110 to 140 will be described in detail with reference to FIG. 1.

In step 110, image data may be received, which may include pixel data for at least one pixel. Exemplarily, the image data may be provided by a controller, a central processor or a graphics processor in a computing device to a pixel driving means, for example, via a data bus or other types of transmission lines. The image data may be data conforming to a preset data protocol format, which may include pixel data for each pixel or part of pixels in the display screen. Exemplarily, a plurality of sets of image data may be received at a preset frequency, wherein each set of image data may represent a frame in a video.

In step 120, a data voltage signal for a target pixel may be determined based on the pixel data for the target pixel in the image data. The pixel data for a pixel may include the pixel value of the pixel. For example, for a monochrome image, the pixel data may reflect the gray level of the pixel, and for a color image, the pixel data may reflect the corresponding brightness of R (red), G (green) and B (blue) of the pixel. For example, the conversion relationship between pixel data and data voltage signals may be set in advance, and may be expressed in various ways, such as look-up tables, curves, function expressions, etc., so that corresponding data voltage signals may be determined based on pixel data according to the conversion relationship. Optionally, before the data voltage signal is determined according to the preset conversion relationship, the pixel data may be processed as required to meet different requirements for data transmission, data storage, data processing and display effect. Such embodiments will be described in detail below.

In step 130, in response to a first enable signal being valid, the target pixel may be driven in a first display mode. In the first display mode, the data voltage signal may be updated at a first frequency and provided to the target pixel, so that the driving voltage of the target pixel is determined as a voltage difference between the data voltage signal and a common voltage signal, wherein the common voltage signal is a reference voltage signal common to all pixels. Generally speaking, the pixel circuit of each pixel may include a storage capacitor, one end of which may be connected to a common voltage signal and the other end may be connected to a data voltage signal, and the storage capacitor may be charged by the voltage difference between them, so that the pixel may display corresponding brightness. Here, the word “connected” should be understood to cover being directly connected or indirectly connected. That is, the storage capacitor may be directly connected to the common voltage signal and the data voltage signal, and may also be connected to one or both of these signals via one or more other intermediate circuit elements. In other expressions of the present disclosure, unless otherwise indicated, the word “connected” should be understood similarly.

Furthermore, for example, the update frequency of the data voltage signal may be controlled by the pixel driving circuit, or may depend on the frequency of image data received by the pixel driving circuit.

In step 140, in response to a second enable signal being valid, the target pixel may be driven in a second display mode. In the second display mode, the data voltage signal may be updated at a second frequency, and adjusted according to the pixel data for the target pixel, and the adjusted data voltage signal may be provided to the target pixel, so that the driving voltage of the target pixel may be determined as the maximum driving voltage or the minimum driving voltage, wherein the second frequency may be lower than the first frequency. For example, the data voltage signal may be adjusted according to some or all significant bits in the pixel data for the target pixel, so that the difference between the adjusted data voltage signal and the common voltage signal is the maximum value or the minimum value. Then, when the storage capacitor in the pixel is charged by the adjusted data voltage signal and the common voltage signal, the maximum driving voltage or the minimum driving voltage may be obtained. Alternatively, the data voltage signal may be adjusted according to some or all significant bits in the pixel data for the target pixel, so that the difference between the adjusted data voltage signal and the common voltage signal (and the zero-difference voltage signal) is the maximum value. Then the maximum driving voltage may be obtained when the storage capacitor in the pixel is charged by the adjusted data voltage signal and the common voltage signal, and the minimum driving voltage may be obtained when the storage capacitor in the pixel is charged by the zero-difference voltage signal and the common voltage signal. Exemplarily, the minimum driving voltage may be zero. Therefore, in the second display mode, the pixel brightness may be the highest or the lowest. Optionally, depending on the control mode of the pixel, when the pixel is driven with zero voltage, the pixel brightness may be the highest or the lowest. For example, in the normal black mode, when the pixel is driven with zero voltage, the brightness of the pixel may be the lowest, while in the normal white mode, when the pixel is driven with zero voltage, the brightness of the pixel may be the highest. This may be designed according to the specific application requirements.

For example, the first frequency and the second frequency may be preset, wherein the first frequency may be a frequency conventionally used by display devices, such as 60 Hz or other approximate frequencies, like any frequency from 60 Hz to 85 Hz, which can meet the display requirements of conventional dynamic pictures, while the second frequency may be a frequency for a low-frequency display mode, such as 1 Hz or other approximate frequencies, like 2 Hz, 0.5 Hz, etc., which may be used for displaying static pictures and may significantly reduce power consumption compared with the first frequency.

In addition, for example, the first enable signal or the second enable signal may be set to be valid by the pixel driving circuit in response to an instruction indicating use of the first display mode or the second display mode, or the first enable signal or the second enable signal may be set to be valid by the pixel driving circuit according to specific display requirements. Further exemplarily, the instruction indicating use of the first display mode or the second display mode may be generated internally by the pixel driving circuit or may be received from an external circuit. For example, a user may choose to use the first display mode or the second display mode through physical or virtual buttons on the computing device, and then the computing device may generate a corresponding instruction according to the user’s choice and provide the instruction to the pixel driving circuit; or, the computing device may automatically determine whether to use the first display mode or the second display mode according to the current requirements, generate a corresponding instruction, and provide it to the pixel driving circuit; or, the pixel driving circuit may judge whether to use the first display mode or the second display mode according to the image data to be displayed, and generate a corresponding instruction; etc.

In the related art, generally, only the display mode at one frequency can be supported, such as the first display mode as described above, or although the related circuit supports display modes at multiple frequencies, only one frequency can be selected during use. However, through the pixel driving method 100, display modes at different frequencies (for example, 60 Hz mode and 1 Hz mode, or other combinations of the first frequency and the second frequency) can be supported, and pixels may be charged in different ways in the two modes. Specifically, different charging ways may be used in different display modes based on different enable signals. In the first display mode, a data voltage signal may be provided to the pixel, so that the pixel may be charged through the voltage difference between the data voltage signal and the common voltage signal. In the second display mode, the determined data voltage signal may be adjusted according to the pixel data, and the adjusted data voltage signal may be provided to the pixel, so that the pixel may be charged by the maximum driving voltage or the minimum driving voltage. In this way, it may be allowed to provide enable signals for different display modes, for example, by manual switching or automatic switching as certain conditions are met, and to update the data voltage at different frequencies and to charge the pixel in different ways in different display modes. In this way, it is not necessary to keep a high frequency display state all the time, which is helpful to reduce the power consumption of the whole device. Specifically, the first display mode with high-frequency may satisfy the requirements of conventional display, while the second display mode with low-frequency may satisfy the requirements of low-power display. In addition, in the second display mode with low-frequency, the driving voltage of each pixel may be determined to be the maximum or minimum driving voltage, that is, each pixel only has two display states of white/black, which may realize simpler processing logic and contribute to further reducing power consumption.

As mentioned above, for wearable devices such as smart watches, the demand for reducing power consumption and prolonging battery endurance time is often stronger. Hence, the pixel driving method provided by the present disclosure may be applied to such devices. According to experiments, by using the technical solution provided by the present disclosure, the power consumption of wearable devices such as smart watches is obviously reduced, which may usually be reduced by 1 to 2 orders of magnitude.

Figure 2:
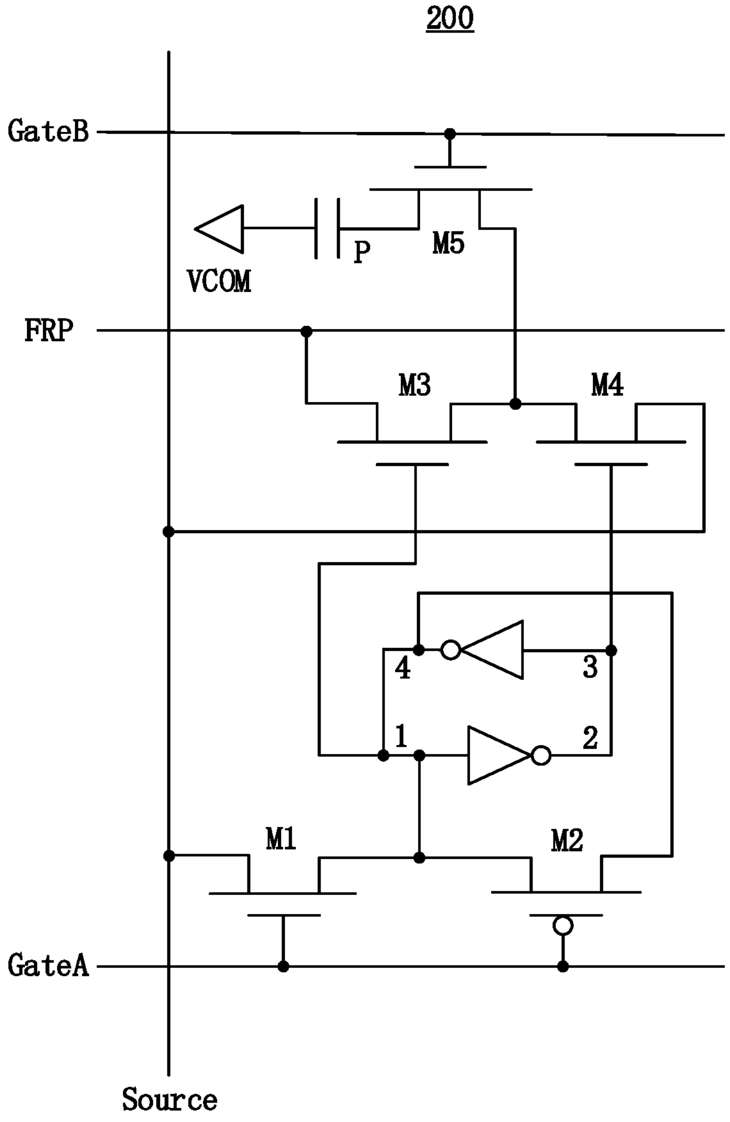
FIG. 2 schematically illustrates an exemplary circuit diagram of a pixel circuit according to some embodiments of the present disclosure.

In some embodiments, the pixel driving method 100 as shown in FIG. 1 may be used in conjunction with the pixel circuit 200 as shown in FIG. 2. That is, the pixel driving method 100 may be used to drive the pixel circuit 200. However, it should be understood that the pixel circuit 200 is only exemplary, and other similar pixel circuits may also be applicable.

As shown in FIG. 2, the pixel circuit 200 may include a first transistor M1, a second transistor M2, a third transistor M3, a fourth transistor M4, a fifth transistor M5 and two inverters connected end to end. Two inverters connected end to end may form a Static Random Access Memory (SRAM), which may be used to store voltage signals, which may control the on-off of M3 and M4. The on-off of M1 and M2 may be determined by the GateA signal. When GateA is high, M1 is turned on and M2 is turned off, and the Source signal may be input to node 1, i.e. to SRAM, via M1. When GateA signal is low, M1 is turned off and M2 is turned on, and SRAM is isolated from the Source signal. The change of the Source signal will not affect the voltage signal in SRAM. When the GateB signal is high, and when the voltage signal in SRAM turns M3 off and M4 on, the storage capacitor P in the pixel circuit 200 may be connected to the Source via M5, while when the voltage signal in SRAM turns M3 on and M4 off, the storage capacitor P may be connected to FRP via M5. The Source signal in FIG. 2 may be regarded as the aforementioned data voltage signal provided by the driving means to the pixel circuit, FRP may be regarded as the zero-difference voltage signal, which, in this circuit, may be a long black voltage signal, and VCOM may be regarded as the common voltage signal. In addition, GateA and GateB are control signals, in which GateA may be regarded as an initialization control signal that is used for line-by-line initialization, and GateB may be regarded as a display control signal that is used for line-by-line display.

Next, operation states of the pixel circuit 200 in the first display mode according to some embodiments of the present disclosure will be described with reference to FIGS. 3A and 3B. As mentioned above, the first display mode may be a display mode at a conventional frequency, such as a mode at 60 Hz or modes at other approximate frequencies.

Figure 3A:
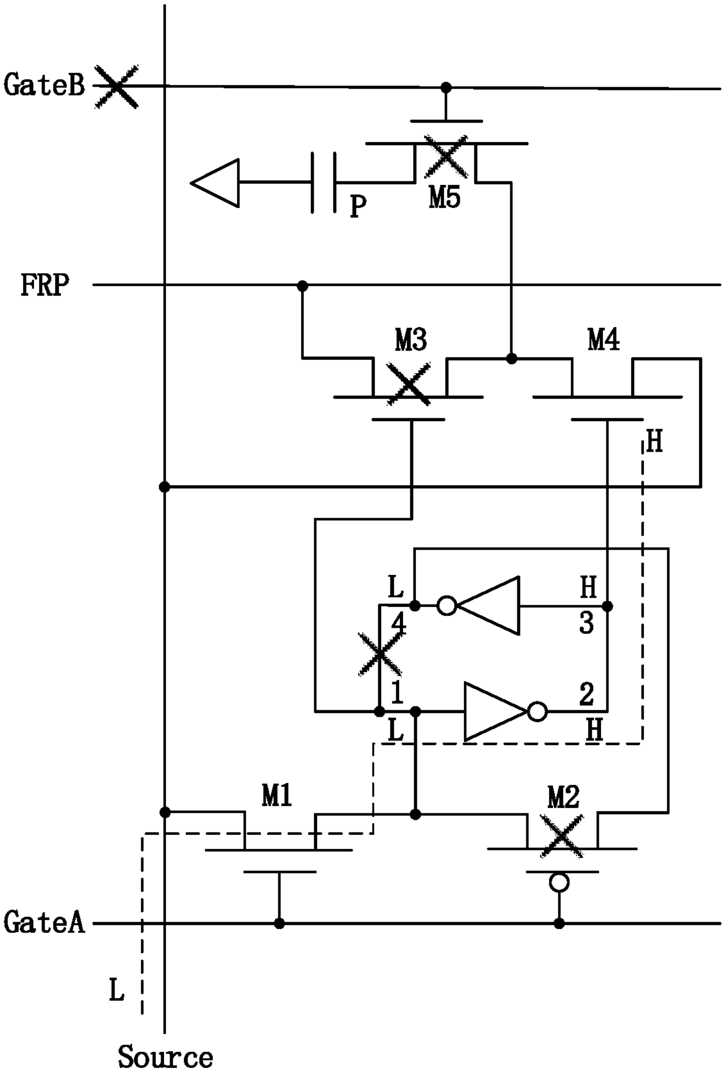
FIGS. 3A and 3B schematically illustrate an operating state of a pixel circuit in a first display mode according to some embodiments of the present disclosure.

FIG. 3A illustrates an initialization stage of the first display mode. As shown in the figure, GateA is at high level. Accordingly, M1 is turned on, M2 is turned off, and the L level (low level) is written in through the Source signal. The L level is reversed for the first time to the H level (high level) by the inverter between node 1 and node 2. The H level turns M4 on, and at the same time, it is reversed for the second time to the L level by the inverter between node 3 and node 4. However, the two inverters are not conducted. GateB is at low level. Accordingly, M5 is turned off, so no data is written into the storage capacitor P, and the pixel does not display.

Figure 3B:
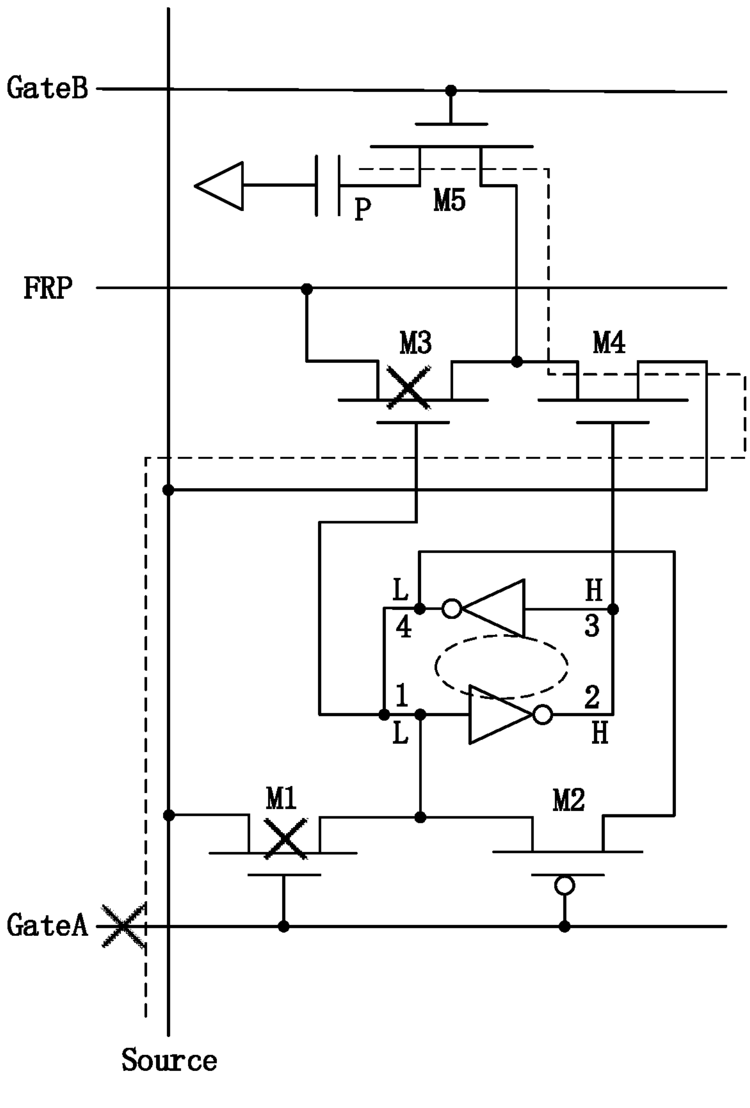

FIG. 3B illustrates a display stage of the first display mode. As shown in the figure, GateA is at low level. Accordingly, M2 is turned on, M1 is turned off, and the two inverters are conducted, keeping the cycle of level, so that M4 is continuously on. GateB is at high level. Accordingly, M5 is turned on, so data may be continuously written through the Source signal and written into the storage capacitor P via M4 and M5. The Source signal and the VCOM signal at ends of the storage capacitor P form a voltage difference, and the pixel displays normally.

Figure 5A:
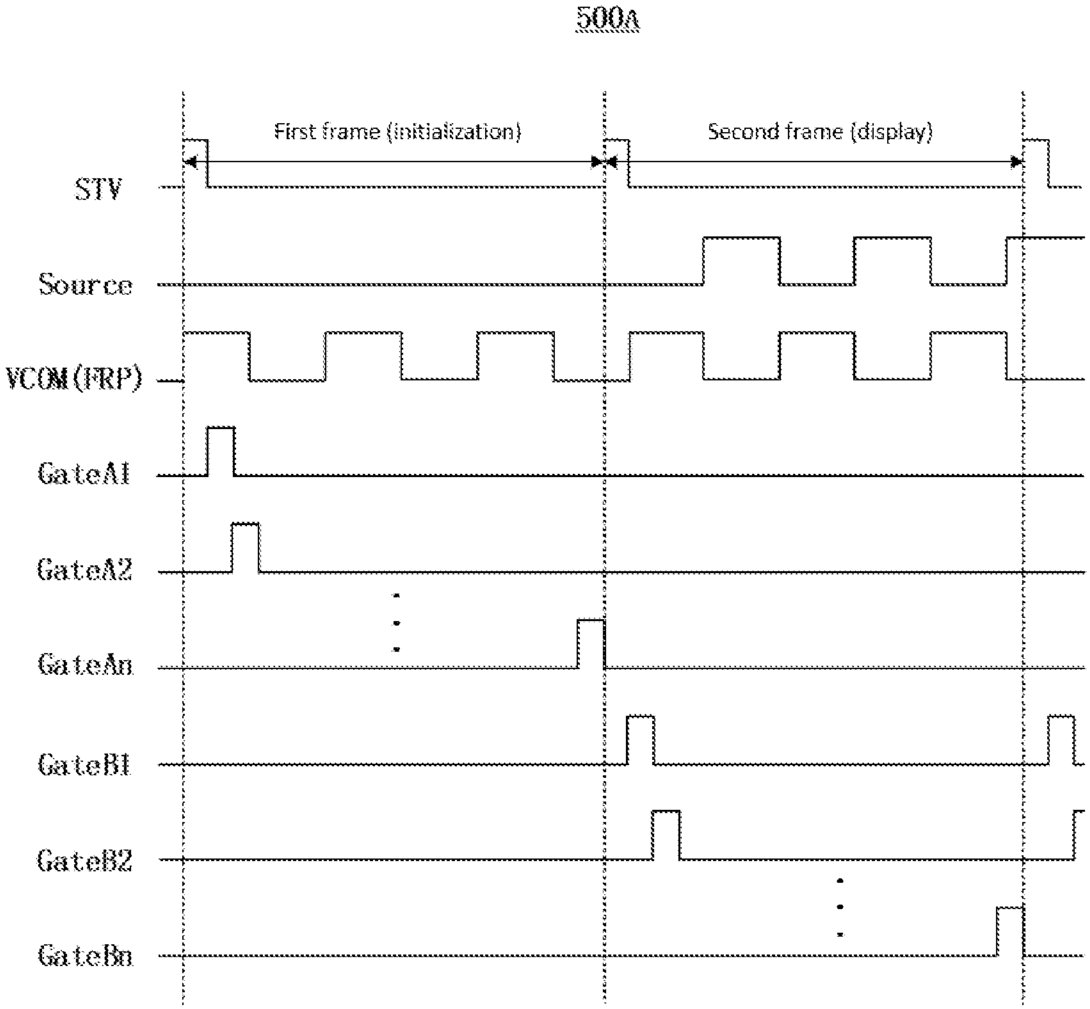
FIGS. 5A and 5B schematically illustrate exemplary driving timings for driving a pixel circuit according to some embodiments of the present disclosure.

Exemplarily, in the first display mode, the pixel circuit 200 may be driven by the driving timing 500A shown in FIG. 5A. FIG. 5A illustrates a column start signal STV, a data voltage signal Source, a common voltage signal VCOM, a long black voltage signal FRP, initialization control signals GateA1 to GateAn for pixel 1 to pixel n, and display control signals GateB1 to GateBn for pixel 1 to pixel n, where $n \geq 1$. As shown in the figure, in the first display mode, the first frame may be used for initialization, and the second frame may be used for normal display. Only when the power is turned on again or the frame rate changes, it is necessary to repeat the process from initialization to normal display. Specifically, in the initialization stage of the first display mode, Source is at low level, and GateA1 to GateAn are set to high level in turn, that is, the pixel circuits are initialized in turn. In the display stage of the first display mode, image data are written into the respective pixel circuits of the pixels through the Source, and GateB1 to GateBn are set to high level in turn, that is, corresponding image data are written into pixel circuits in turn, in order to display a frame image. Exemplarily, taking the 60 Hz mode as an example, the duration of each frame may be about 16.7 ms.

Next, an operating state of the pixel circuit 200 in the second display mode according to some embodiments of the present disclosure will be described with reference to FIGS. 4A, 4B, 4C and 4D. For convenience of description, in the embodiments described with reference to FIGS. 4A-4D, it is assumed that the pixel circuit 200 is a pixel circuit under the normal black mode, and it may be driven similarly for the normally white mode, wherein the corresponding relationship between the driving voltage and the pixel gray level (or pixel brightness) needs to be adjusted. As mentioned above, the second display mode may be a low-frequency display mode, such as a 1 Hz mode or other modes with approximate frequencies. In some embodiments, the second display mode may be further divided into a White mode in which the pixel driving voltage is determined as the maximum driving voltage and the highest brightness is displayed, and a Black mode in which the pixel driving voltage is determined as the minimum driving voltage (e.g., zero voltage) and the lowest brightness (e.g., all Black) is displayed.

Figure 4A:
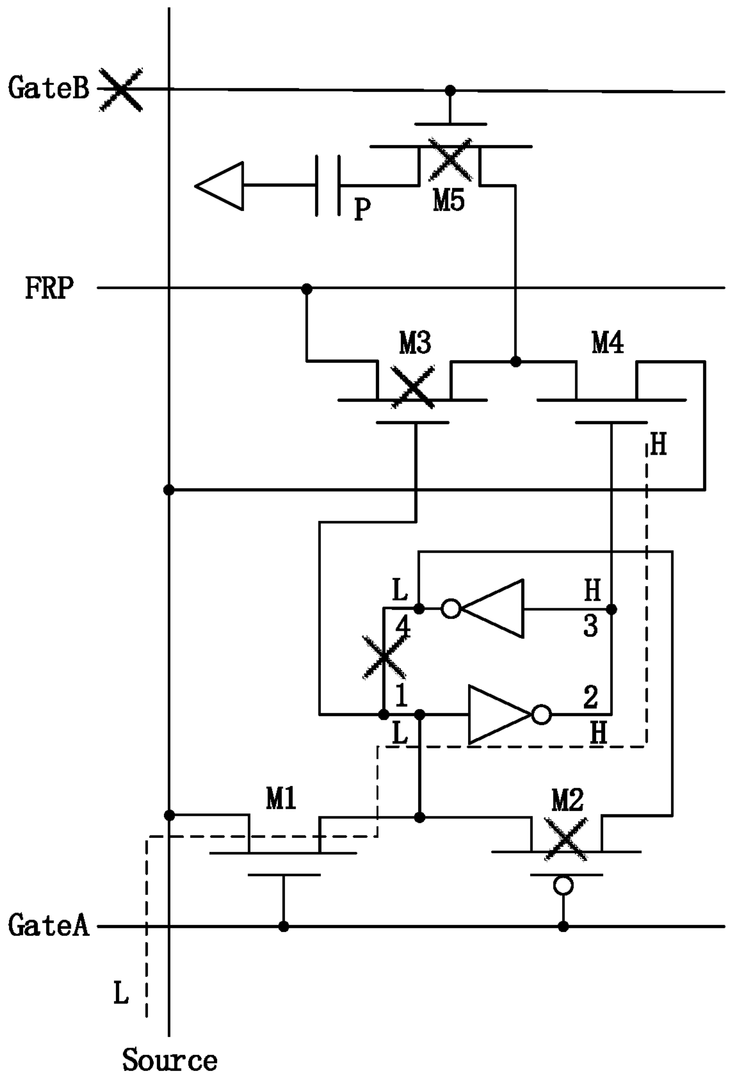
FIGS. 4A, 4B, 4C and 4D schematically illustrate an operating state of a pixel circuit in a second display mode according to some embodiments of the present disclosure.

FIG. 4A illustrates an initialization stage of the White mode of the second display mode. This stage is similar to the initialization stage of the first display mode. As shown in the figure, GateA is at high level. Accordingly, M1 is turned on, M2 is turned off, and the L level (low level) is written in through the Source signal. The L level is reversed for the first time to the H level (high level) by the inverter between node 1 and node 2. The H level turns M4 on, and it is reversed for the second time to the L level by the inverter between node 3 and node 4. However, the two inverters are not conducted. GateB is at low level. Accordingly, M5 is turned off, so no data is written into the storage capacitor P, and the pixel does not display.

Figure 4B:
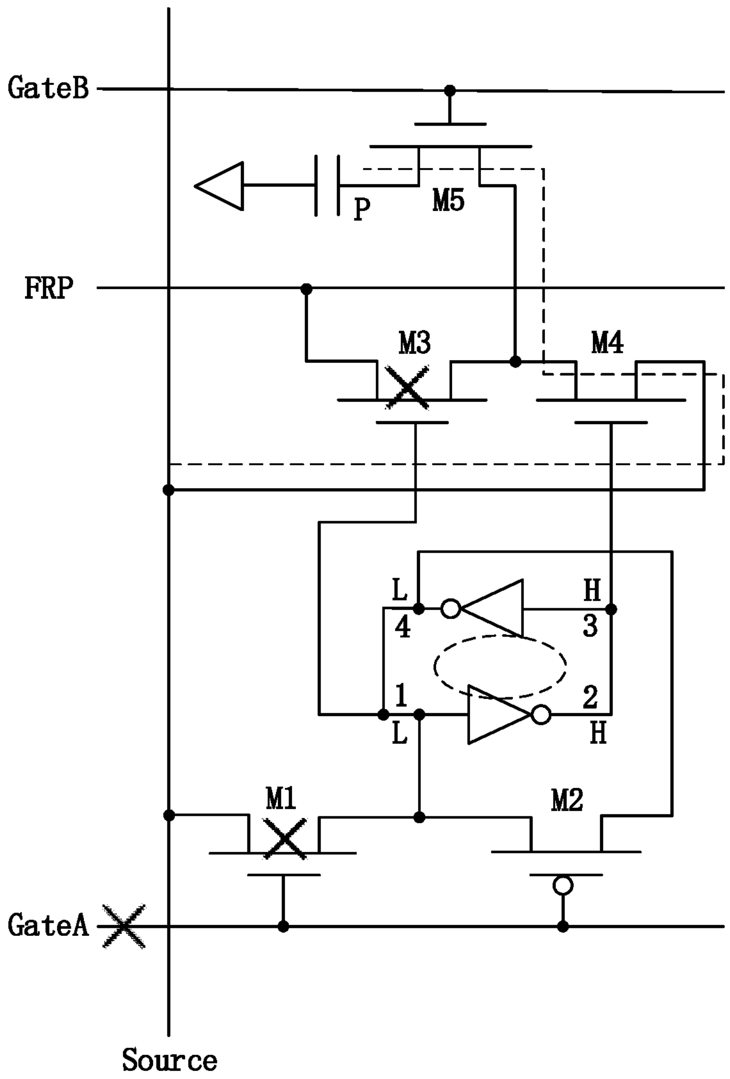

FIG. 4B illustrates the display stage of the White mode of the second display mode. As shown in the figure, GateA is at low level. Accordingly, M2 is turned on, M1 is turned off, and the two inverters are conducted, keeping the cycle of level, so that M4 is continuously on. GateB is at high level. Accordingly, M5 is turned on. Therefore, data may be continuously written through the Source signal and written into the storage capacitor P via M4 and M5. The Source signal and the VCOM signal at ends of the storage capacitor P form a voltage difference, and the pixel displays normally. In some embodiments, when a static picture is displayed, the system side does not continuously write image data. For the pixel circuit, the Source data of the previous frame may be written into the storage capacitor P via M4 and M5, and the Source data may be stored in a buffer means, which will be introduced later.

Figure 4C:
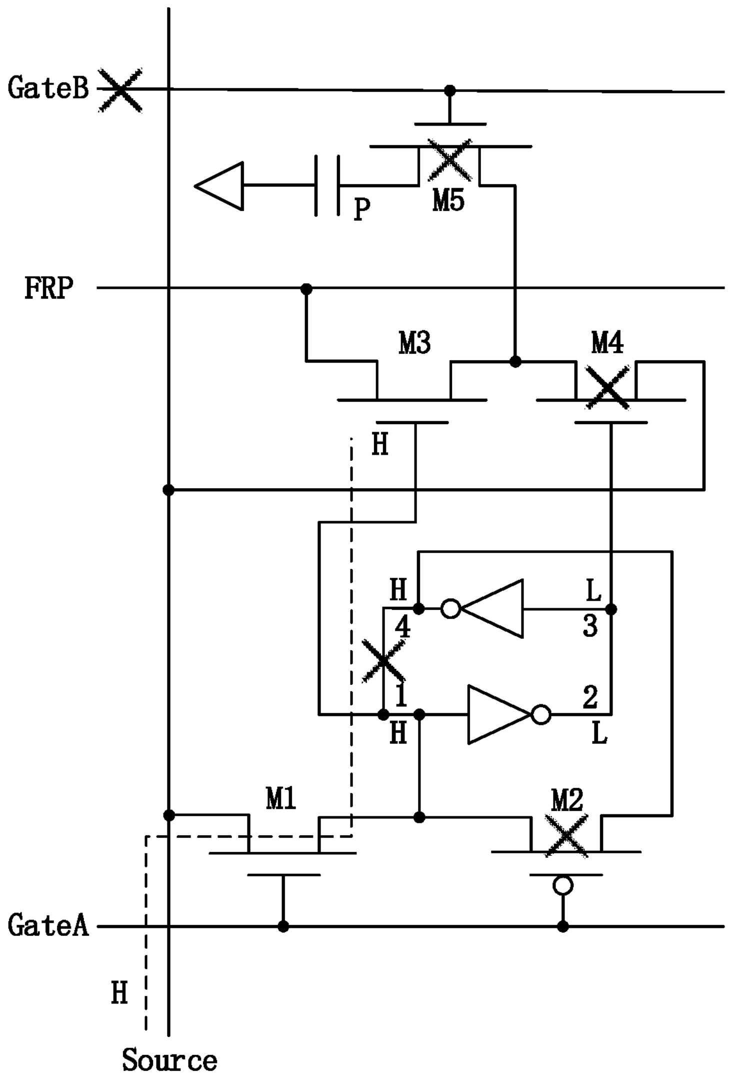

FIG. 4C illustrates an initialization stage of the Black mode of the second display mode. As shown in the figure, GateA is at high level. Accordingly, M1 is turned on and M2 is turned off. H level is written in through the Source signal, which turns M3 on. And the H level is reversed for the first time to L level by the inverter between node 1 and node 2, and then reversed for the second time to H level by the inverter between node 3 and node 4. But the two inverters are not conducted. GateB is at low level. Accordingly, M5 is turned off, so no data is written into the storage capacitor P, and the pixel does not display.

Figure 4D:
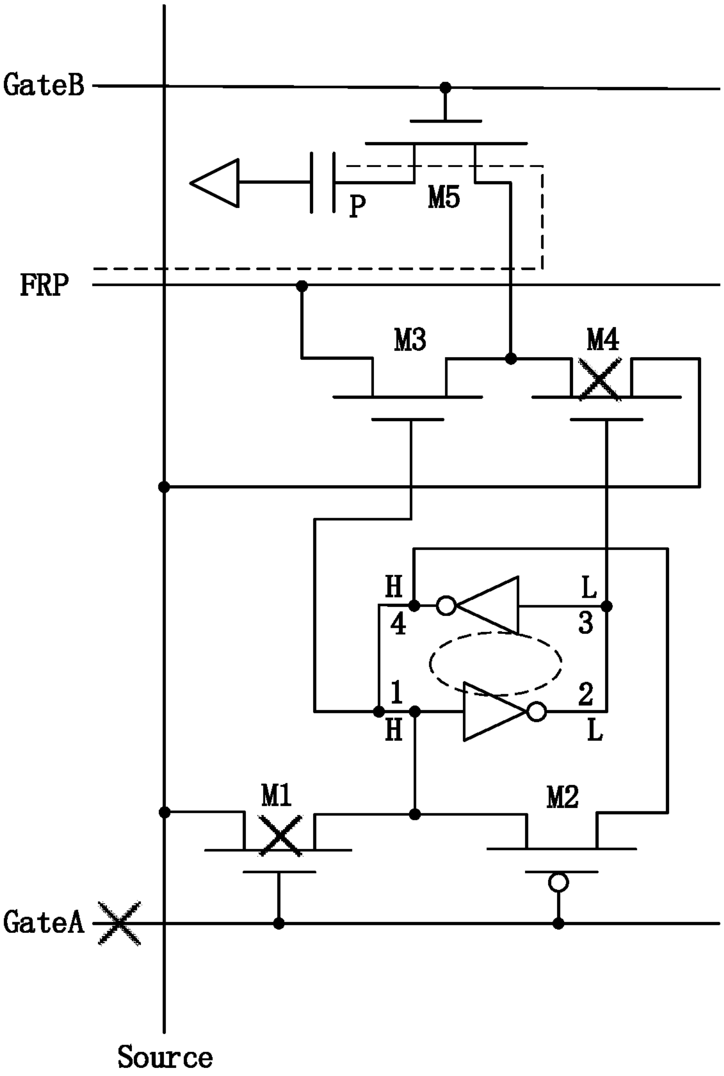

FIG. 4D illustrates the display stage of the Black mode of the second display mode. As shown in the figure, GateA is at low level. Accordingly, M2 is turned on, M1 is turned off, and the two inverters are conducted, keeping the cycle of level, so that M3 is continuously on. GateB is at high level. Accordingly, M5 is turned on. Therefore, the FRP signal may be written into the storage capacitor P via M3 and M5. The voltage difference between the FRP signal and the VCOM signal at ends of the storage capacitor P is zero, and the pixel displays black. In some embodiments, when a static picture is displayed, the system side does not continuously write image data. For the pixel circuit, in the next frame, it may continue to initialize to the Black mode through the high level of the Source signal, and write the FRP signal into the storage capacitor P via M3 and M5. When the picture is updated, the system side will write new image data.

Figure 5B:
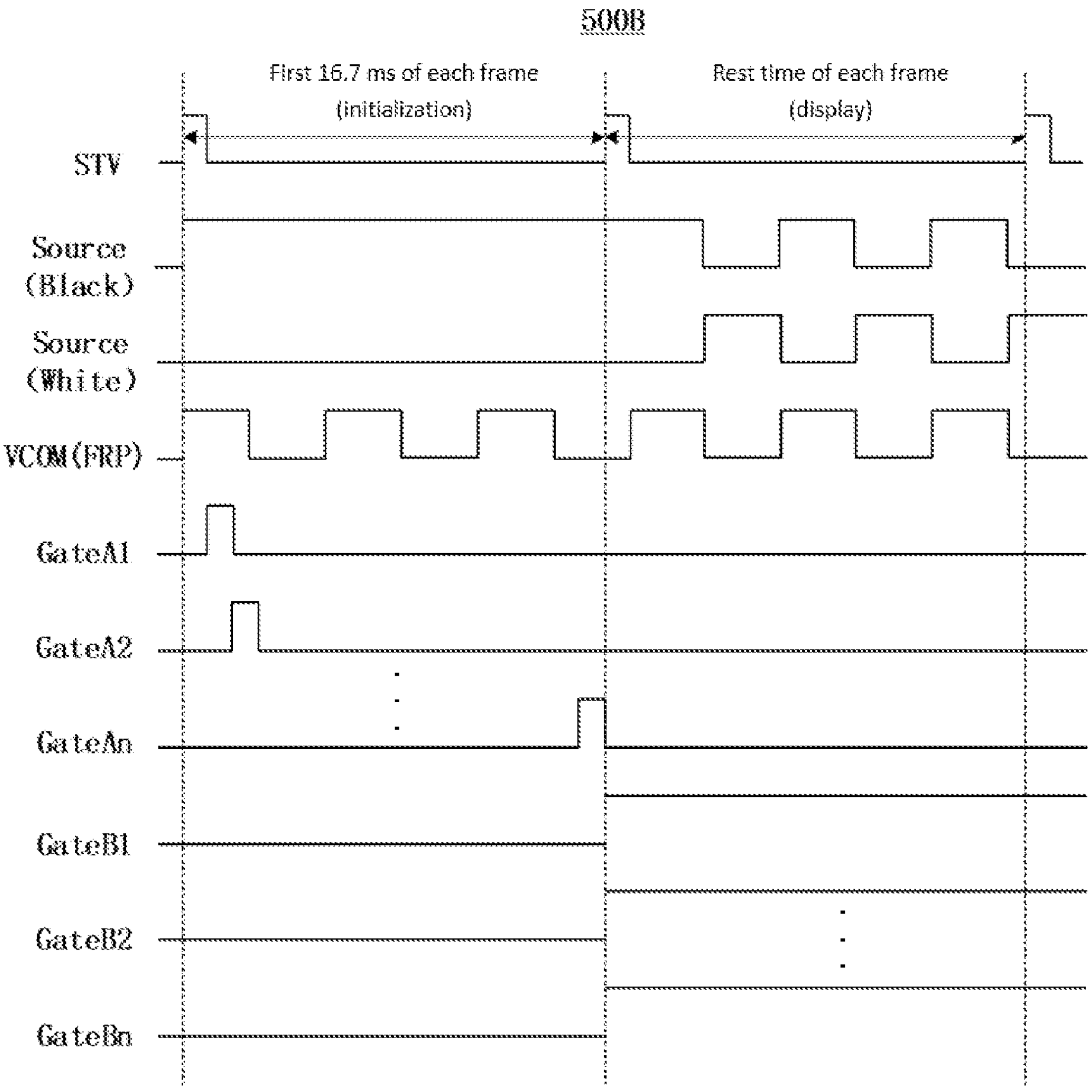

Exemplarily, in the second display mode, the pixel circuit 200 may be driven by the driving timing 500B shown in FIG. 5B. FIG. 5B illustrates a column start signal STV, a data voltage signal Source (Black) for black mode, a data voltage signal Source (White) for white mode, a common voltage signal VCOM, a long black voltage signal FRP, initialization control signals GateA1 to GateAn for pixel 1 to pixel n, and display control signals GateB1 to GateBn for pixel 1 to pixel n, where n≥1. As shown in the figure, in the second display mode, part of the time in each frame may be used for initialization, and the rest time may be used for normal display. Taking the 1 Hz mode as an example, each frame time is 1 s, in which the first 16.7 ms may be used for initialization and the rest time may be used for normal display. It should be understood that the duration of the initialization stage may be set according to requirements, which may be equal to or different from the duration of one frame in the first display mode. Specifically, in the initialization stage of the Black mode of the second display mode, the Source is at high level, and GateA1 to GateAn are set to high level in turn, that is, the pixel circuits are initialized in turn. In the display stage of the Black mode of the second display mode, the pixels are charged by FRP and VCOM, and GateB1 to GateBn are kept at high level, that is, FRP signals are continuously provided to the pixel circuits, so that related pixels may continuously display black. In the initialization stage of the White mode of the second display mode, Source is at low level, and GateA1 to GateAn are set at high level in turn, that is, the pixel circuits are initialized in turn. In the display stage of the White mode of the second display mode, image data are written into the pixel circuits of pixels through the Source, GateB1 to GateBn are kept at high level, that is, corresponding Source signal is continuously written into the pixel circuits, so as to display a frame image. Since the second display mode involves the selection of Black or White mode for pixels, the process from initialization to normal display needs to be repeated at the beginning of each frame.

It should be understood that the above descriptions are all for transistors with high valid control level. In fact, transistors with low valid control level may also be used. In this case, relevant driving signals may be set to be opposite to those in the above descriptions.

In some embodiments, pixel data for a target pixel may include at least one significant data bit. The data format of image data will be introduced in detail with examples below, and will not be described here. In these embodiments, step 140 may include, in response to the most significant data bit in the at least one significant data bit being a first value, adjusting the data voltage signal so that the driving voltage of the target pixel is determined as the maximum driving voltage, and in response to the most significant data bit in the at least one significant data bit being a second value, adjusting the data voltage signal so that the driving voltage of the target pixel is determined as the minimum driving voltage. Exemplarily, when the most significant data bit in the pixel data is 1, the data voltage signal may be adjusted so that the driving voltage of the target pixel is determined as the maximum driving voltage. For example, the data voltage signal may be adjusted so that the target pixel displays in the White mode as described above. When the most significant data bit in the pixel data is 0, the data voltage signal may be adjusted so that the driving voltage of the target pixel is determined as the minimum driving voltage (such as zero). For example, the data voltage signal may be adjusted so that the target pixel displays in the Black mode as described above. Therefore, it may be determined that the target pixel displays with the highest brightness or the lowest brightness according to only the value of the most significant bit of the pixel data, which is helpful to reduce the data processing amount and simplify the processing logic, thus further reducing the power consumption.

In some embodiments, the driving voltage of the target pixel may be determined as the maximum driving voltage or the minimum driving voltage in the following manner. Specifically, in order to determine the driving voltage of the target pixel as the maximum driving voltage, in the initialization period, the data voltage signal may be determined as the first voltage signal, and valid initialization control signals may be provided to the pixels in turn. Subsequently, in the display period, the data voltage signal may be determined as the opposite of the common voltage signal, and a continuously valid display control signal may be provided to the target pixel, so that the driving voltage of the target pixel may be determined as the voltage difference between the data voltage signal and the common voltage signal. In order to let the driving voltage of the target pixel be determined as the minimum driving voltage, during the initialization period, the data voltage signal may be determined as the second voltage signal, and valid initialization control signals may be provided to the pixels in turn. Then, during the display period, the target pixel may be provided with a zero-difference voltage signal, which is the same as the common voltage signal, and a continuously valid display control signal may be provided to the target pixel, so that the driving voltage of the target pixel may be determined as the voltage difference between the zero-difference voltage signal and the common voltage signal.

Still taking the pixel circuit described with reference to FIGS. 4A-4D as an example, the case where the driving voltage of the target pixel is determined as the maximum driving voltage may be the aforementioned White mode. In the White mode, during the initialization period, the data voltage signal may be determined as low level, and during the display period, the data voltage signal may be determined to be opposite to the common voltage signal, for example, like the Source (White) signal shown in FIG. 5B. The case where the driving voltage of the target pixel is determined as the minimum driving voltage may be the aforementioned Black mode. In the Black mode, during the initialization period, the data voltage signal may be determined as high level, for example, like the Source (Black) signal shown in FIG. 5B, and during the display period, a long black voltage signal identical to the common voltage signal may be provided, for example, like the FRP signal identical to VCOM shown in FIG. 5B. In addition, for example, valid initialization control signals may be provided to the pixels in turn during the initialization period like GateA1 to GateAn shown in FIG. 5B, and continuously valid display control signals may be provided to the pixels during the display period like GateB1 to GateBn.

In the above embodiments, the data voltage signal may be adjusted, and the pixel may be set to display with maximum brightness or minimum brightness through the adjusted data voltage signal during the initialization period, and the display control signal may be made to be valid continuously during the display period, so that each pixel may continuously display with the maximum brightness or minimum brightness. Therefore, it is convenient to control the display state, that is, displaying with the maximum brightness or the minimum brightness, of each pixel in each period.

Figure 6:
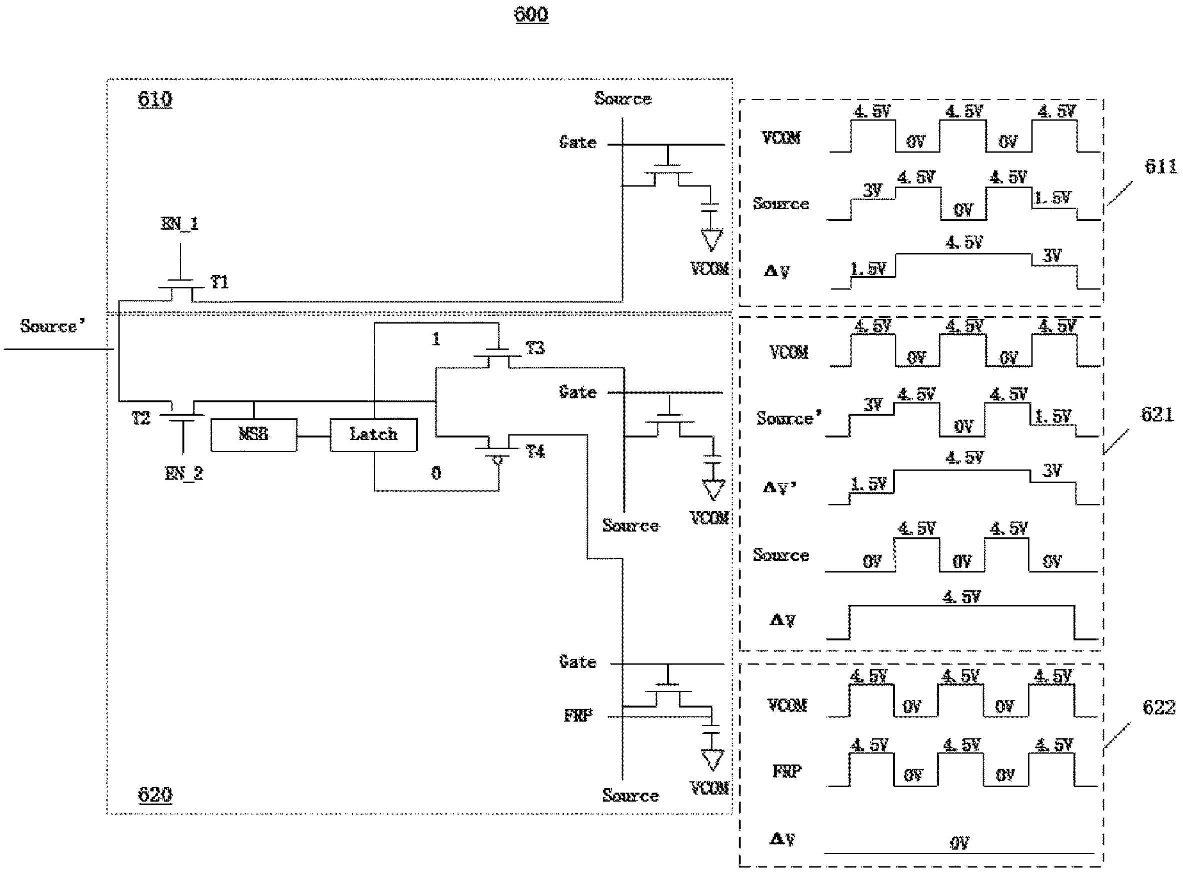
FIG. 6 schematically illustrates an exemplary circuit diagram of a pixel charging circuit for charging a pixel circuit according to some embodiments of the present disclosure.

In some embodiments, the pixel may be charged by the pixel charging circuit 600 shown in FIG. 6. As shown in FIG. 6, the pixel charging circuit 600 includes two charging paths 610 and 620. The charging path 610 may be used to charge the pixel circuit in the first display mode and the charging path 620 may be used to charge the pixel circuit in the second display mode.

As shown in FIG. 6, the pixel charging circuit 600 may receive a data voltage signal Source', which may be generated based on pixel data in the aforementioned step 120. When the first enable signal EN_1 is valid and the second enable signal EN_2 is invalid, the pixel circuit may be driven in the first display mode. At this time, the Source' signal is transmitted to the first charging path 610 via the transistor T1, and then provided to a corresponding pixel circuit as the Source signal, and written into the storage capacitor of the pixel circuit, so that the Source signal and the VCOM signal form a voltage difference across the storage capacitor, making the pixel display corresponding brightness. In some embodiments, the voltage difference may be directly proportional to the pixel brightness. Exemplarily, FIG. 6 also schematically illustrates an exemplary driving timing 611 for the first charging path 610. As shown in the figure, VCOM may vary between 4.5V and 0V, and the Source signal may be determined as a series of voltage signals according to the image data, such as 3V, 4.5V, 0V, 4.5V and 1.5V as shown in the figure. So the charging voltage of the storage capacitor may be determined as the difference $\Delta$ V between them.

When the first enable signal EN_1 is invalid and the second enable signal EN_2 is valid, the pixel circuit may be driven in the second display mode. At this time, the Source' signal is transmitted into the second charging path 620 via the transistor T2. In order to judge whether the pixel driving voltage should be determined as the maximum value or the minimum value in the second display mode, the numerical value of the most significant bit of the pixel data may be latched to each pixel. Optionally, the numerical value of most significant bit may be taken from the Source' signal, corresponding pixel data in image data, corresponding pixel data in processed image data, etc. For example, when the most significant bit is 1, T3 is turned on, and the pixel circuit is driven in the White mode (still taking the normally black mode as an example here), wherein the Source' signal is adjusted to the Source signal, so that there is a maximum voltage difference between the Source signal and the VCOM signal. Exemplarily, FIG. 6 also schematically illustrates an exemplary driving timing 621 in the White mode for the second charging path 620. As shown in the figure, Source' may be adjusted to Source, so as to charge the storage capacitor of the pixel circuit with the maximum voltage difference of 4.5V, so that the pixel displays with the highest brightness. When the most significant bit is 0, T4 is turned on to drive the pixel circuit in the Black mode, wherein the Source' signal is adjusted to the Source signal, so that the storage capacitor of the pixel circuit may be charged by the voltage difference between the long black voltage signal FRP and VCOM. Exemplarily, FIG. 6 also schematically illustrates an exemplary driving timing 622 in the Black mode for the second charging path 620. As shown in the figure, VCOM is the same as FRP, which makes the voltage across the storage capacitor zero, thus making the pixel display black.

For simplicity, in FIG. 6, the pixel circuit is not completely shown, and only the Source terminal, the VCOM terminal, the Gate terminal and the like are schematically shown. It should be understood that here, the pixel circuit may have the same or similar structure as described in the previous embodiments, and may be driven as described in the previous embodiments.

In some embodiments, step 120 described with reference to FIG. 1 may include buffering pixel data for a preset number of pixels in the image data, and according to a preset digital-to-analog conversion rule, converting the pixel data for the target pixel in the buffered pixel data into the data voltage signal for the target pixel. Because the data transmission rate of the interface may be different from the data processing rate inside the driving means, for example, the data transmission rate may be higher than the data processing rate, the received image data may be buffered for subsequent processing and use. Optionally, the preset digital-to-analog conversion rule may be a preset digital-to-analog conversion function, a preset look-up table, etc. The digital-to-analog conversion process may complete the conversion from digital signal to analog signal (i.e. data voltage signal) according to the significant data bits in pixel data, and the converted analog signal may be input to the display screen and determine the gray-scale color of the display screen.

In some embodiments, in the process of buffering image data, in response to the number of significant data bits in the pixel data for a preset number of pixels being greater than a first threshold, the pixel data for the preset number of pixels may be compressed according to a preset compression rule so that the number of significant data bits in the compressed pixel data won't be greater than the first threshold. In order to save storage space and reduce the pressure of data transmission rate inside the driving means, pixel data may be compressed in units of a preset number of pixels, where the preset number may be preset values such as 2, 3 and 4, and the first threshold may be 36 bit or other values. It can be understood that the preset number and the first threshold may be set according to specific application requirements, for example, different preset numbers may be set according to different data formats of image data, and the first threshold may be set according to the processing capacity inside the driving circuit.

In the above embodiment, in the process of converting the buffered pixel data into the data voltage signal, the compressed pixel data may be decompressed, and the pixel data for the target pixel in the decompressed pixel data may be converted into the data voltage signal for the target pixel.

In some embodiments, in the process of buffering image data, in response to the number of significant data bits in the pixel data for a preset number of pixels being less than a first threshold, the pixel data for a preset number of pixels may be complemented according to a first preset bit complement rule, so that the number of significant data bits in the complemented pixel data is equal to the first threshold. In order to ensure that the pixel data has the same or similar format in the process of storage, transmission and processing inside the driving means, so as to be managed in a unified way, when the number of significant data bits in the pixel data for a preset number of pixels is less than the first threshold, it may be complemented to the first threshold. The first preset bit complement rule may be set to zero-padding, or it may be set to other bit complementing ways according to the specific application requirements.

In the above embodiment, in the process of converting the buffered pixel data into a data voltage signal, in response to the number of significant data bits in the pixel data for the target pixel electrode being less than the second threshold, the pixel data for the target pixel electrode may be complemented according to a second preset bit complement rule, so that the number of significant data bits in the complemented pixel data is equal to the second threshold. For example, the second preset bit complement rule may be preset according to application requirements, for example, it may be set through relevant registers, such as zero-padding, one-padding, MSB (most significant bit)-padding, Green LSB (Green least significant bit)-padding and so on. For example, the bit complement control signal EPF may be generated based on the setting result of the register to specify how to perform the bit complement.

In the above embodiment, in the process of converting the buffered pixel data into data voltage signals, in response to receiving pixel data for at least two pixels every clock cycle, the pixel data for at least two pixels may be redistributed into at least two groups of pixel data for different pixels. For example, when the number of significant data bits in the pixel data for one pixel is too low, in order to unify the number of clock signals for receiving image data in different data formats and improve transmission efficiency, pixel data for two or more pixels may be received in one clock cycle and buffered and processed as a whole. In this example, in order to ensure that the pixel data may be provided to the correct pixel, before generating the data voltage signal, the pixel data for two or more pixels may be redistributed into two or more groups of independent pixel data.

Next, as an example, referring to FIGS. 7A to 7E, several data formats suitable for the technical solution provided by the present disclosure will be briefly introduced. It should be understood that the data formats shown in the drawings are only exemplary, and other types of data formats may be designed and used based on the technical solution provided by the present disclosure.

As shown in the figure, the data format may be composed of CMD (control information) and DATA (data information), where CMD may be used to specify information such as data protocol type and DATA may be used to transmit image data. For example, 1 byte may include 9 bits, wherein the first byte may be used to transmit CMD, and DATA may be started to be transmitted from the second byte. The first bit in each byte may be used for functions such as error correction without transmitting actual data. For different data formats, the significant data bits used to transmit data may be different.

Figure 7A:
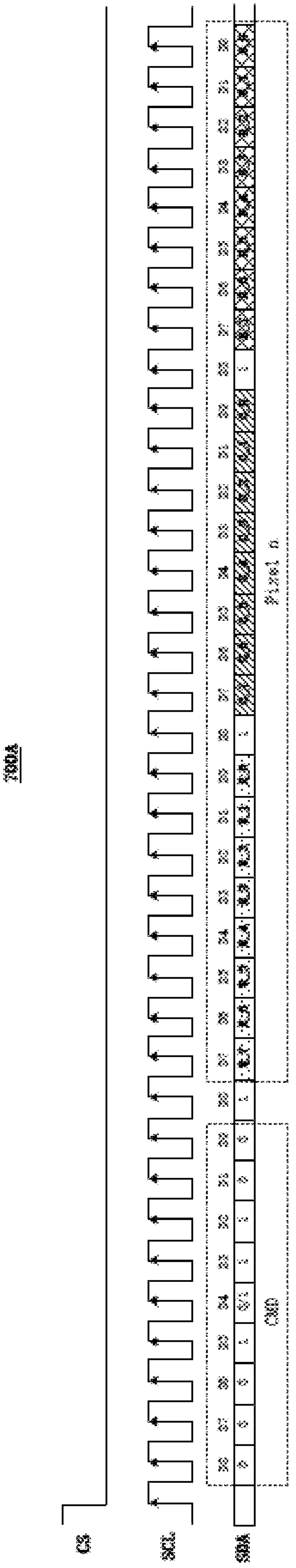
FIGS. 7A, 7B, 7C, 7D and 7E schematically illustrate transmission protocols of exemplary data formats for image data according to some embodiments of the present disclosure.
Figure 7B:
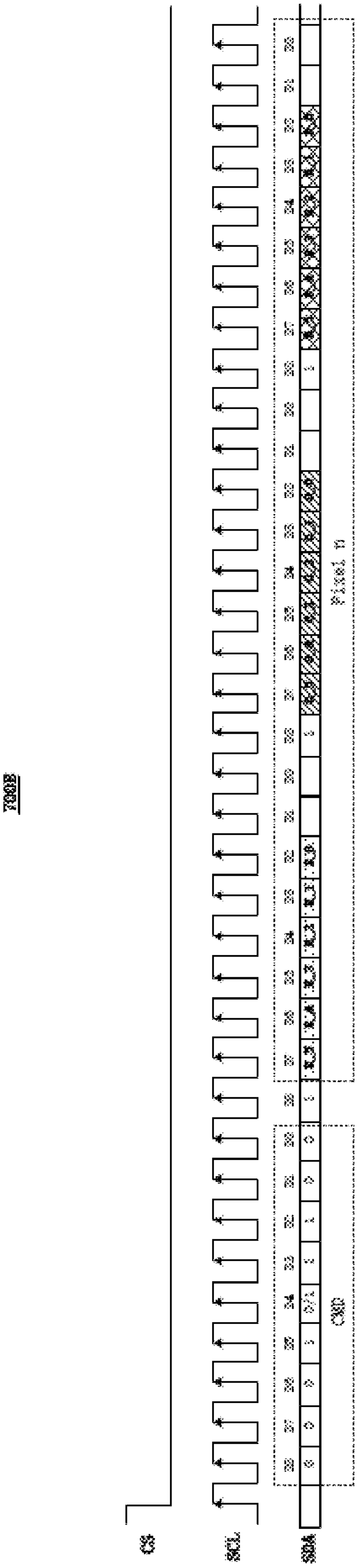
Figure 7C:
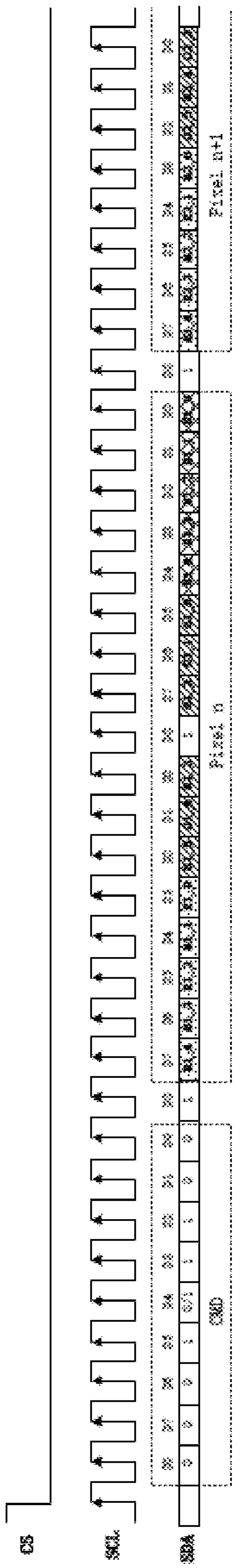
Figure 7D:
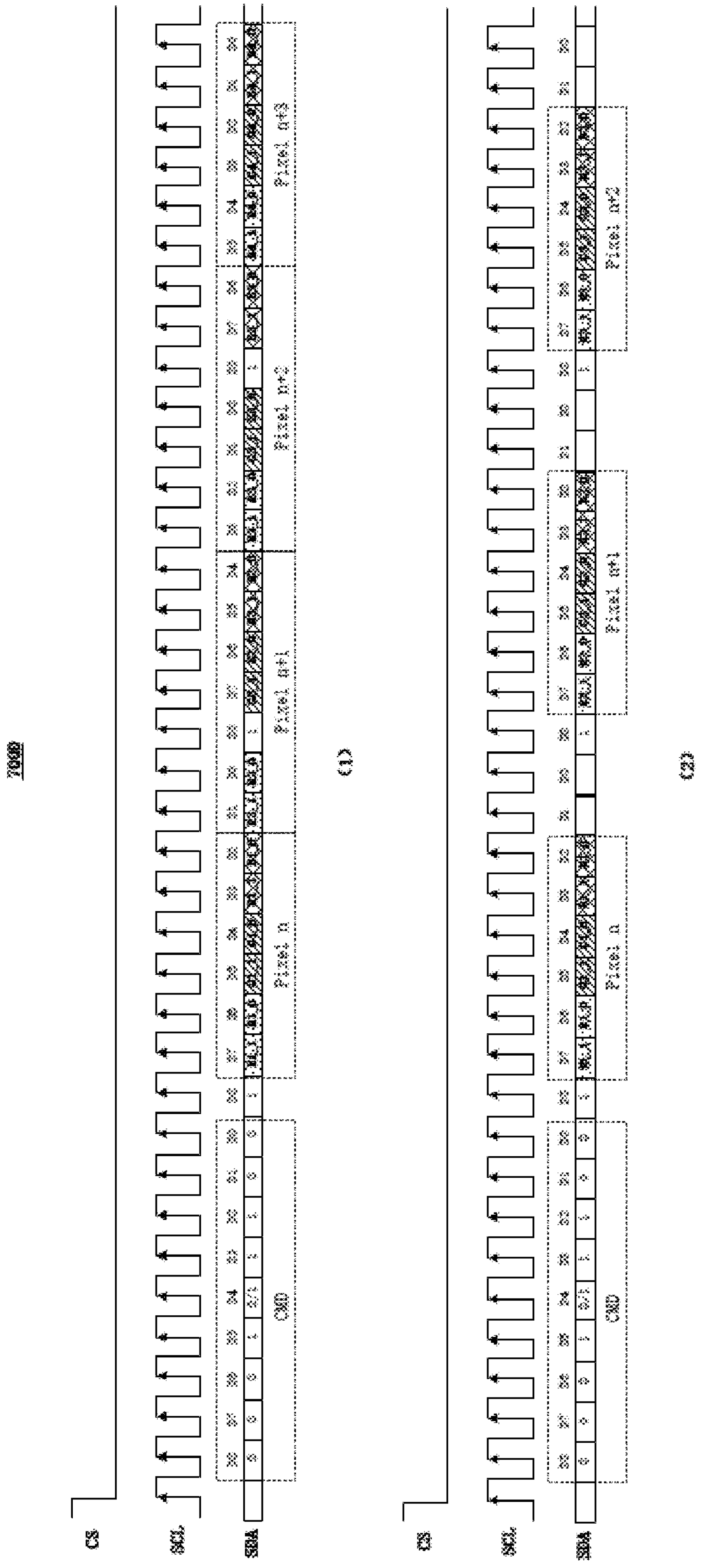

Specifically, FIG. 7A schematically illustrates a transmission protocol 700A for a 24-bit data format. In the 24-bit data format, the pixel data of each pixel may be composed of 8-bit red data, 8-bit green data and 8-bit blue data, and may be transmitted in 3 bytes. FIG. 7B schematically illustrates a transmission protocol 700B for an 18-bit data format. In the 18-bit data format, the pixel data of each pixel may be composed of 6-bit red data, 6-bit green data and 6-bit blue data, and may also be transmitted in 3 bytes, but there are 2 free bits in each byte. FIG. 7C schematically illustrates a transmission protocol 700C for a 16-bit data format. In the 16-bit data format, the pixel data of each pixel may be composed of 5-bit red data, 6-bit green data and 5-bit blue data, and may be transmitted in 2 bytes. FIG. 7D schematically illustrates transmission protocols 700D for a 6-bit data format. In the 6-bit data format, the pixel data of each pixel may be composed of 2-bit red data, 2-bit green data and 2-bit blue data. For the 6-bit data format, two types of different protocols are designed. As shown in the upper part of FIG. 7D, the pixel data of each pixel may be continuously transmitted without free bits, which may improve the data transmission efficiency. As shown in the lower part of FIG.

Figure 7E:
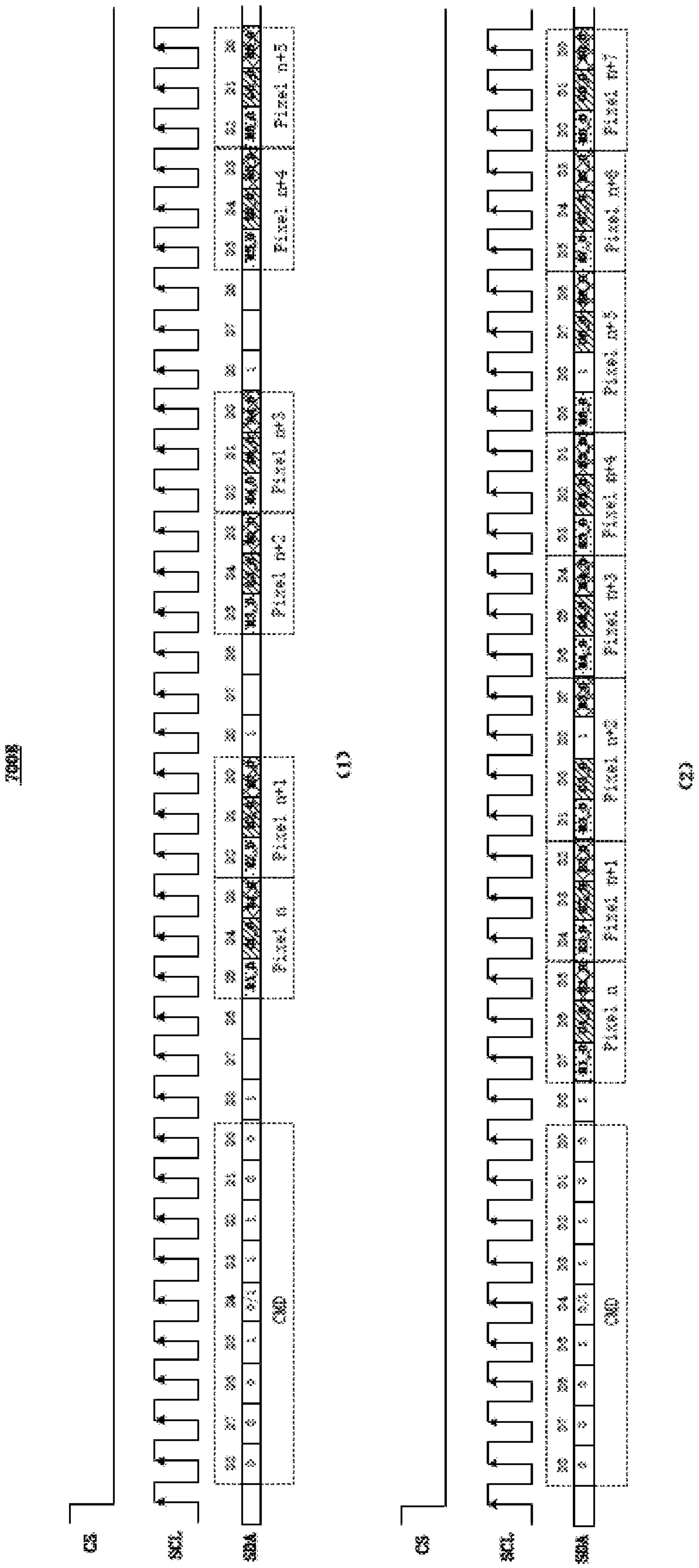

7D, the pixel data for only one pixel may be transmitted in one byte, and the other two bits are free, so that although the data transmission efficiency is lost to some extent, it is helpful to reduce the complexity of data processing. One of these two types of protocols may be selected according to the data transmission condition at the system side. FIG. 7E schematically illustrates transmission protocols 700E for a 3-bit data format. In the 3-bit data format, the pixel data of each pixel may be composed of 1-bit red data, 1-bit green data and 1-bit blue data. For the 3-bit data format, two different types of protocols are also designed. As shown in the upper part of FIG. 7E, in one byte, the pixel data for only two pixels may be transmitted, and the other two bits are free. As shown in the lower part of FIG. 7E, the pixel data of each pixel may be continuously transmitted without free bits. Similar to the 6-bit data format, the two types of protocols have different advantages, and one of them may be selected according to the data transmission condition at the system side.

For example, in accordance with the different requirements and characteristics of the first display mode and the second display mode mentioned above, in the first display mode, data formats with more significant data bits like those shown in FIG. 7A, FIG. 7B and FIG. 7C may be used preferentially, so as to present more abundant picture details and provide display effects meeting the conventional requirements. However, in the second display mode, data formats with less significant data bits like those shown in FIGS. 7D and 7E may be used preferentially, so as to reduce data transmission, simplify data processing logic and further reduce overall power consumption. However, according to the actual application requirements, the data format with less significant data bits may also be used in the first display mode or the data format with more significant data bits may be used in the second display mode.

For different data formats, it may be processed according to the schemes described in the previous embodiments to finally generate corresponding data voltage signals. Exemplarily, FIGS. 8A to 8D schematically illustrate the data processing flows of the data formats described with reference to FIGS. 7A to 7E.

Exemplarily, for convenience of understanding, the data processing flows shown in FIGS. 8A to 8D are described based on the following assumptions. The pixel driving means may take the form of a driver IC. The system side may write the image data into the driver IC according to one of the aforementioned data formats, and the driver IC may receive the image data, process it through multiple stages of data processing, and finally write the data into the corresponding pixel circuit through the Source. For the driver IC, data transmission may be carried out in units of 24 bits, that is, 24 bits of data may be received per clock cycle (i.e. per CLK), and if 1 bit of data is received per clock rising edge, then each clock cycle should include at least 24 clock rising edges. Inside the driver IC, data processing may be composed of three modules of compression/decompression (MC/MD), data mapping and digital-to-analog conversion (D/A). For MC/MD module, data processing with 36-bit significant data bits is allowed based on pixel data of at least one pixel. That is, when the number of significant data bits of the pixel data of the at least one pixel exceeds 36 bits, the pixel data needs to be compressed, and when the number of significant data bits is less than 36 bits, the pixel data needs to be complemented, for example, by padding 0. The acquisition and processing of D/A data may be carried out in unit of 24 bits, so the data mapping module may complement the pixel data with less than 24 bits. As mentioned above, the rules for bit complementing may be set as zero-padding, one-padding, MSB-padding, Green LSB-padding, etc. according to requirements.

Figure 8A:
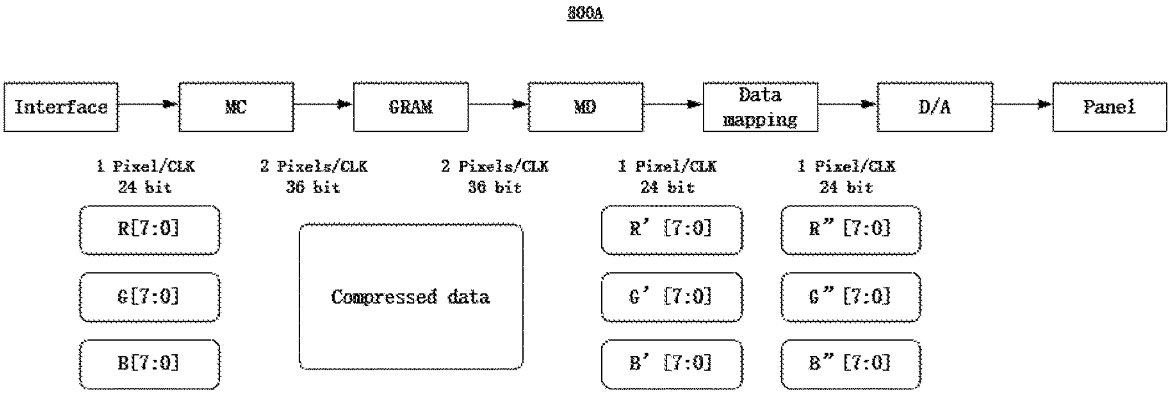
FIGS. 8A, 8B, 8C and 8D schematically illustrate exemplary processing flows for various data formats according to some embodiments of the present disclosure.

FIG. 8A schematically illustrates a processing flow 800A for the 24-bit data format. As shown in the figure, the IC interface may receive image data at 1 pixel/CLK. For the 24-bit data format, that is, 24 bits of significant data are received per CLK, so there is no need for bit complementing operation. In MC/MD, the image data exists at 2 pixels/CLK (that is, 48-bit significant data bit), so ¾ compression should be enabled to compress the pixel data from 48-bit to 36-bit, and store it in GRAM. Then it may be restored to 48-bit significant data bits after decompression. The data mapping module receives pixel data of one pixel at a time, that is, it receives 24-bit of significant data bits. The pixel data may directly enter the D/A module for digital-to-analog conversion without bit complement, to generate the corresponding data voltage signal and to provide the same to the display panel.

Figure 8B:
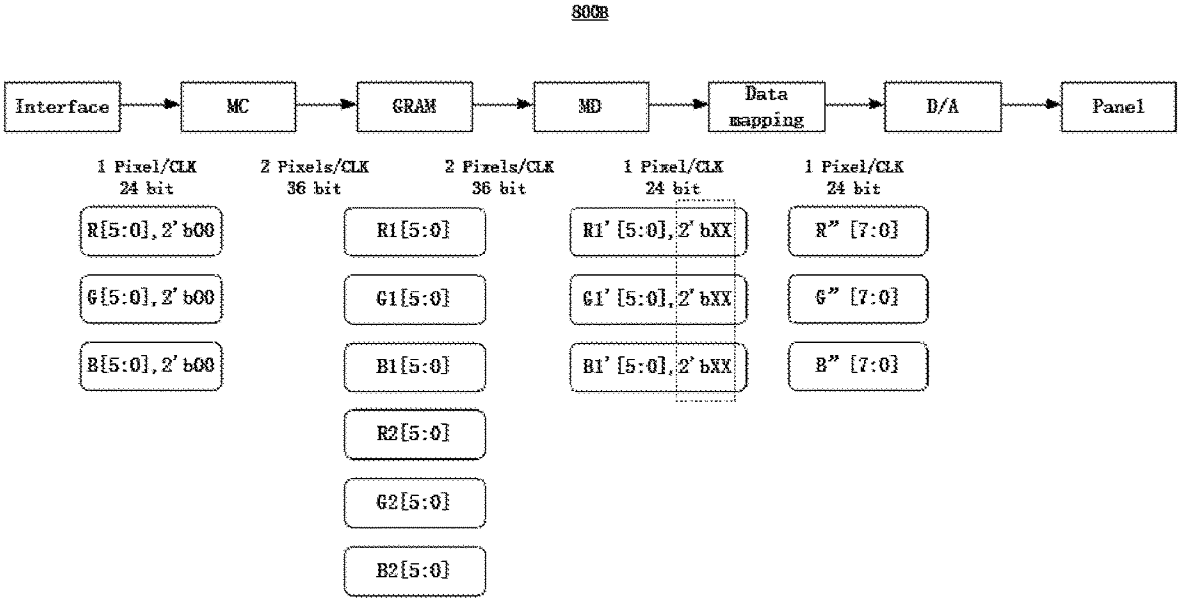

FIG. 8B schematically illustrates a processing flow 800B for the 18-bit data format. As shown in the figure, the IC interface may receive image data at 1 pixel/CLK, and for the 18-bit data format, that is, 18 bits of significant data bits are received per CLK, complemented by 0 to 24 bits. In MC/MD, the image data exists at 2 pixels/CLK (i.e., 36 bits of significant data bits), and it is not necessary to enable data compression and decompression. The image data may be directly input to the data mapping module via this module. The data mapping module receives pixel data of one pixel at a time, that is, it receives 18 bits of significant data bits, which needs to be complemented to 24 bits. The complemented data enters the D/A module for digital-to-analog conversion to generate the corresponding data voltage signal, and to provide the same to the display panel. For the 16-bit data format, the processing flow is similar to that of the 18-bit data format, and only the number of complementing bits is different, so it is not repeated here.

Figure 8C:
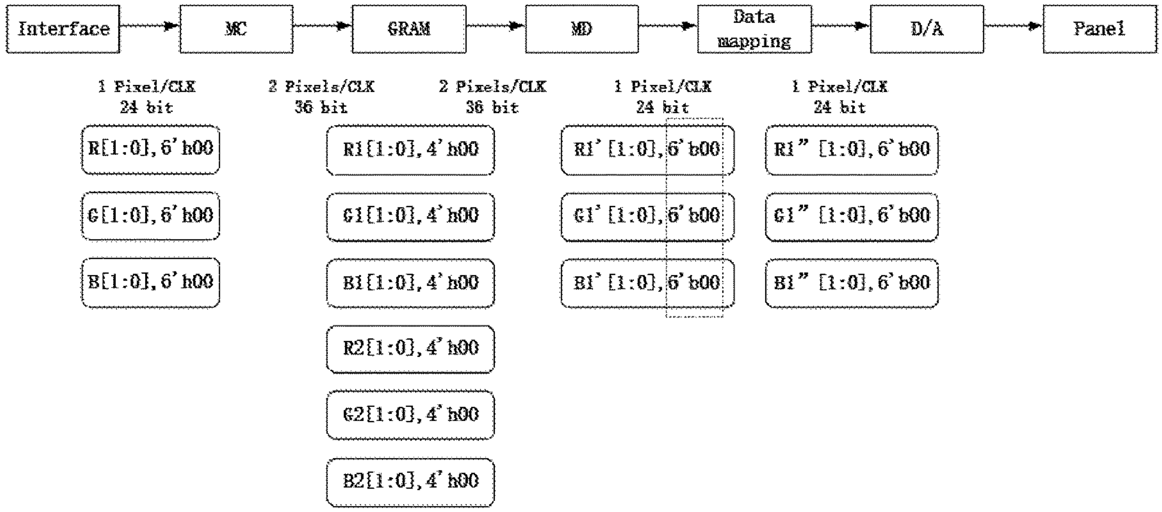

FIG. 8C schematically illustrates a processing flow 800C for the 6-bit data format. As shown in the figure, the IC interface may receive image data at 1 pixel/CLK, and for the 6-bit data format, that is, 6-bit significant data bits are received per CLK, which is complemented by 0 to 24 bits. In MC/MD, the image data exists at 2 pixels/CLK (i.e., 12 significant data bits), and it is unnecessary to enable data compression and decompression, and it may be complemented to 36 bits. The data mapping module receives pixel data of one pixel at a time, that is, it receives 18-bit data (including 12-bit significant data bits), which needs to be complemented to 24 bits. The complemented data enters the D/A module for digital-to-analog conversion to generate the corresponding data voltage signal, and to provide the same to the display panel. For the 6-bit data format, considering that it is mainly used in the second display mode with low frequency, in order to reduce the processing complexity, and, in the second display mode, the data voltage signal may be determined only according to the value of the most significant data bit, the bit complementing operation may be completed only by padding 0.

Figure 8D:
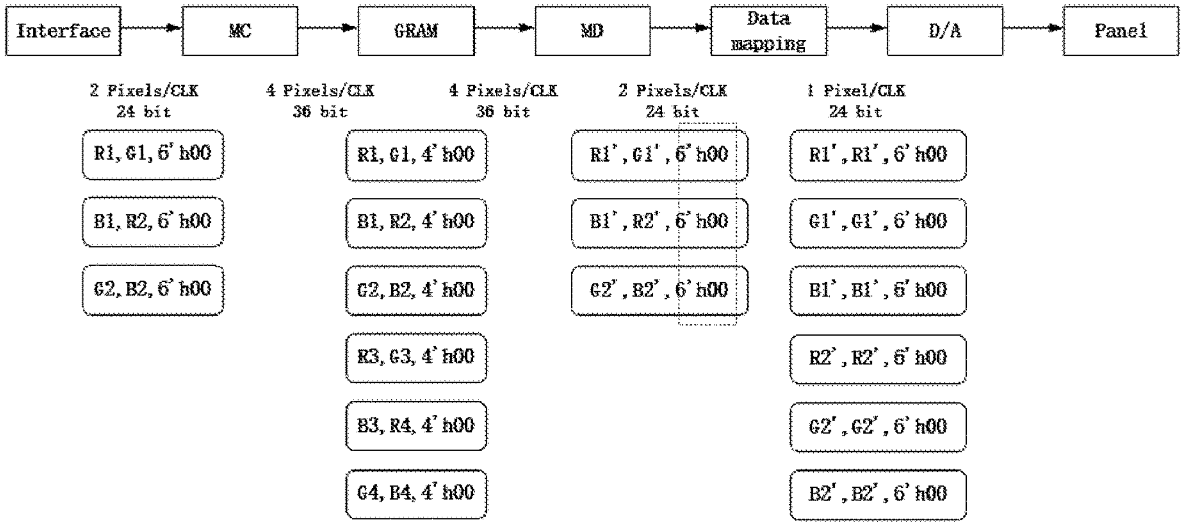

FIG. 8D schematically illustrates a processing flow 800D of a 3-bit data format. As shown in the figure, for the 3-bit data format, for higher data transmission efficiency, the IC interface may receive image data at 2 pixels/CLK, that is, 6-bit of significant data bits are received every CLK, which is complemented by 0 to 24 bits. In MC/MD, the image data exists at 4 pixels/CLK (i.e., 12 significant data bits), and it is not necessary to enable data compression and decompression, and it may be complemented to 36 bits. The data mapping module receives pixel data of 2 pixels at a time, that is, it receives 18 bits of data (including 12 bits of significant data bits), which needs to be complemented to 24 bits. Because now the complemented 24 bits of data actually contains pixel data for two pixels, in order to ensure that the pixel data may be provided to the corresponding pixel, it is necessary to redistribute the data into two groups of pixel data. Optionally, when redistributing, the second highest bit of each pixel data may be made equal to the highest bit's value. The redistributed pixel data may enter the D/A module in turn for digital-to-analog conversion to generate the corresponding data voltage signal and to provide the same to the display panel. For the 3-bit data format, similar to the 6-bit data format, the bit complementing operation may be completed only by padding 0.

In some embodiments, it is possible to switch between the first display mode and the second display mode by providing a mode switching instruction.

For example, in the first display mode, in response to receiving an instruction to switch to the second display mode, enabling data for the second display mode may be written into the mode register, and after a first preset time interval, the second enable signal may be made valid based on the enabling data in the mode register. As mentioned in the previous embodiments, the instruction to switch to the second display mode may be received from the system side. For example, the user may manually choose to switch to the second display mode, or the system side may automatically determine to switch to the second display mode in some cases, and based on this manual or automatic switching operation, the instruction to switch to the second display mode may be sent to the pixel driving circuit. The corresponding enabling data may be written into the mode register in response to the relevant switching instruction being received, and then, the first enable signal or the second enable signal may be provided to the pixel charging circuit such as those described in the previous embodiments based on the enabling data stored in the mode register. The first preset time interval may be set according to specific application requirements, which may be used as a buffer time to help avoiding circuit processing errors.

Figure 9A:
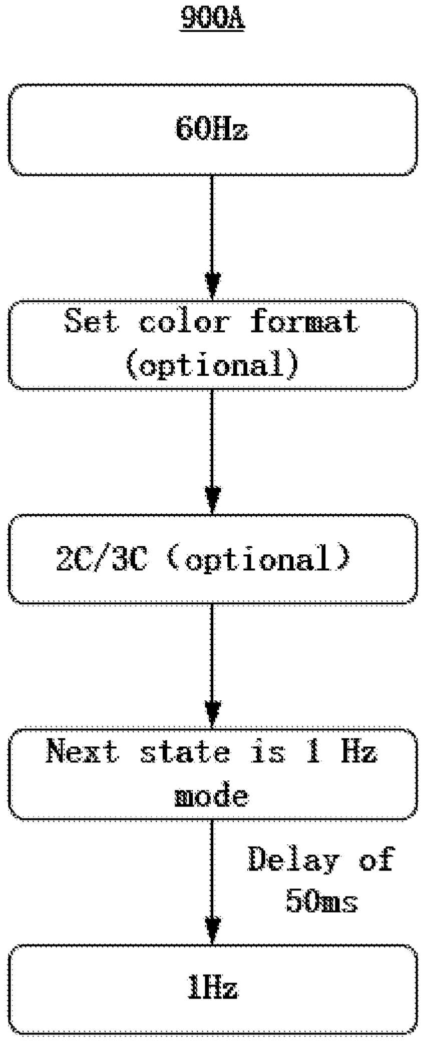
FIGS. 9A, 9B and 9C schematically illustrate exemplary flowcharts for mode switching or image data updating according to some embodiments of the present disclosure.

Taking 60 Hz mode and 1 Hz mode as an example, FIG. 9A schematically illustrates an exemplary flow 900A of switching from 60 Hz mode to 1 Hz mode. As shown in the figure, in the 60 Hz mode, optionally, the color format may be set. For example, according to the previous embodiments, the corresponding data format may be set based on the CMD information in the image data received from the system side or other related instructions, so that an appropriate processing flow can be selected according to the characteristics of the data format and requirements, which has been described in detail in the previous embodiments and will not be repeated here. After setting the color format, optionally, image data (2C/3C data) may be received. When an instruction to switch to the 1 Hz mode is received, enabling data for the 1 Hz mode may be written into the mode register, and after a time interval of 50 ms, the mode may be switched to the 1 Hz mode, and the second enable signal may be made valid.

Exemplarily, in the second display mode, in response to receiving new image data, a data voltage buffer may be opened, the data voltage signal determined based on the new image data may be written into the data voltage buffer, and the data voltage buffer may be closed after a second preset time interval. As mentioned above, the second display mode may be used to display static pictures, so in this mode, the system side may not continuously provide image data to the pixel driving circuit. Therefore, in the second display mode, after generating the corresponding data voltage signal based on image data, the generated data voltage signal may be stored in the data voltage buffer, so that the data voltage signal may be provided or updated based on the data in the data voltage buffer in each display cycle. This buffering mechanism is helpful to reduce the data transmission pressure between the system side and the pixel driving circuit and the data transmission pressure inside the pixel driving circuit in the second display mode, and to reduce unnecessary data processing operations in the pixel driving circuit.

Figure 9B:
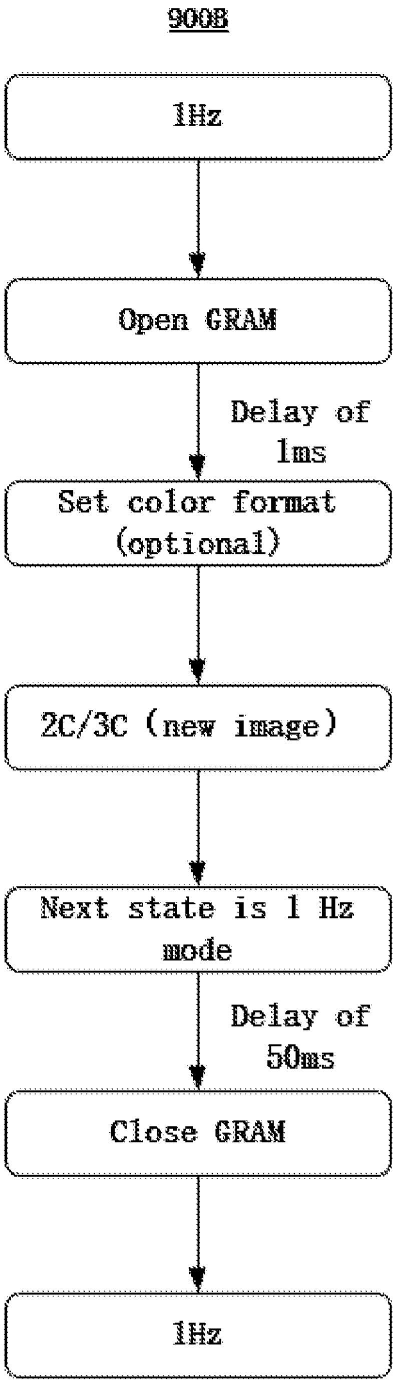

Taking the 1 Hz mode as an example, FIG. 9B schematically illustrates a processing flow 900B when new image data is received in the 1 Hz mode. As shown in the figure, in the 1 Hz mode, when new image data is received, the data voltage buffer (such as GRAM for buffering the data voltage signal) may be opened, and after a delay of 1 ms, new image data may be received. Optionally, the color format (e.g., data format of image data) may be set according to CMD information or additional instructions. Subsequently, a corresponding data voltage signal may be generated based on the new image data and written into the data voltage buffer. Before a mode switching instruction being received, the 1 Hz mode may be maintained according to the enabling data stored in a mode register. When the new image data is received and processed completely, the data voltage buffer may be closed after a time interval of 50 ms.

For example, in the second display mode, in response to receiving an instruction to switch to the first display mode, enabling data for the first display mode may be written into the mode register, and the data voltage buffer may be opened. Subsequently, the data voltage signal may be written into the data voltage buffer. After a third preset time interval, the data voltage buffer may be closed, and the first enable signal may be made valid based on the enabling data in the mode register. As mentioned in the previous embodiments, the instruction to switch to the first display mode may be received from the system side, and the system side may send the instruction to switch to the first display mode to the pixel driving circuit based on manual or automatic switching operation. The pixel driving circuit may write enabling data for the first display mode into the mode register based on receiving the instruction, so that it can be ready to switch to the first display mode. In order to reduce the complexity of processing logic, in this case, the image data updating process in the second display mode described above may be followed. That is, the data voltage buffer may be opened and the data voltage signal generated based on image data may be stored in the data voltage buffer, wherein the stored data voltage signal may be generated based on new image data or the data voltage signal corresponding to previous image data. Subsequently, the first display mode may be switched to according to the enabling data in the mode register, and the first enable signal may become valid.

Figure 9C:
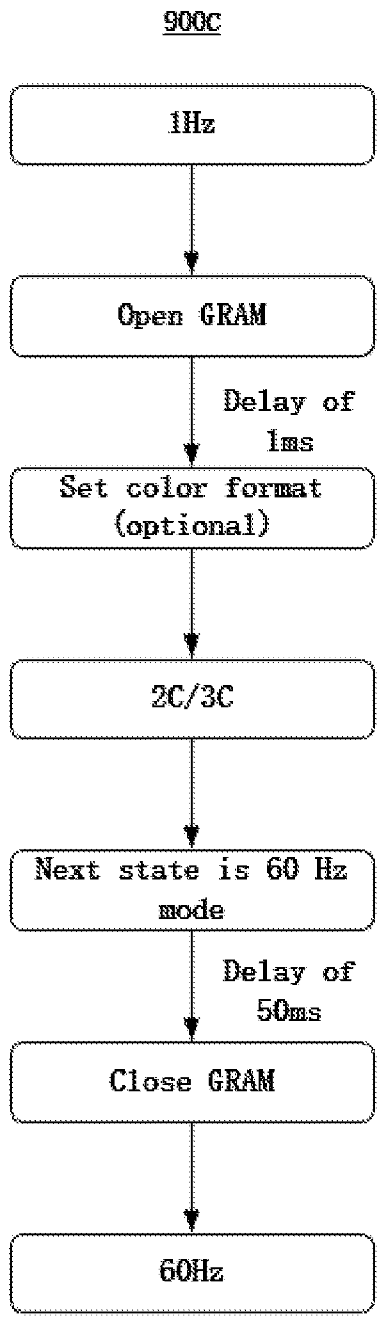

Taking 60 Hz mode and 1 Hz mode as an example, FIG. 9C schematically illustrates an exemplary flow 900C of switching from 1 Hz mode to 60 Hz mode. As shown in the figure, in the 1 Hz mode, in response to receiving an instruction to switch to 60 Hz, enabling data for the 60 Hz mode may be written into the mode register, and the data voltage buffer may be opened to store the data voltage signal generated based on image data. Optionally, the color format may be set as described in the previous embodiments. After setting the color format, optionally, image data (2C/3C data) may be received. Subsequently, it is possible to switch to 60

Hz mode according to the enabling data in the mode register, and the data voltage buffer may be closed after a time interval of 50 ms.

Figure 10:
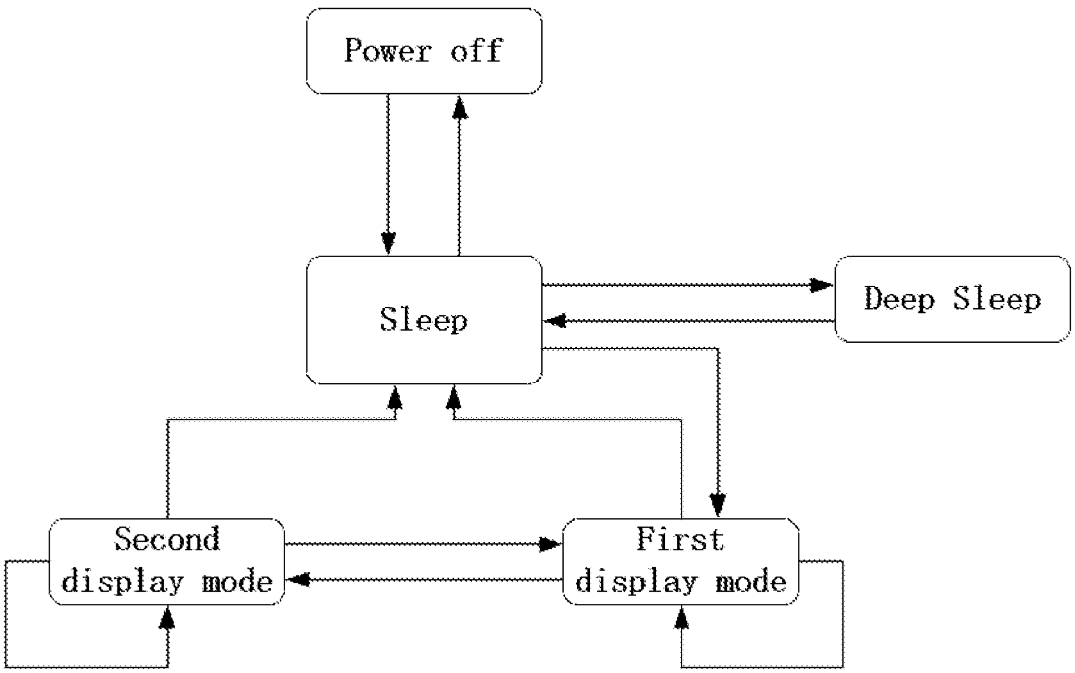
FIG. 10 schematically illustrates an exemplary internal mode switching diagram of a pixel driving circuit according to some embodiments of the present disclosure.

As mentioned above, the first display mode may be used to meet the conventional display requirements. Therefore, in some embodiments, when the pixel driving circuit is powered on, it may directly enter the first display mode, and image data may be continuously written and updated in the first display mode. When static images need to be displayed or power consumption needs to be reduced, it may be manually or automatically switched to the second display mode. In the second display mode, the picture data may be updated at a low frequency and it may be switched back to the first display mode when necessary. Exemplarily, FIG. 10 schematically illustrates a mode switching diagram 1000 inside a pixel driving circuit. As shown in the figure, in the power-off state, the pixel driving circuit may enter the sleep state in response to the power-on operation. In the sleep state, in response to the power-off operation, the pixel driving circuit may be restored to the power-off state; when the sleep time is long or in response to a related state switching operation, the pixel driving circuit may enter the deep sleep state; when receiving image data from the system side or receiving related instructions, the pixel driving circuit may be switched to the first display mode (for example, 60 Hz mode). In the deep sleep state, when receiving the data signal or instruction from the system side, the pixel driving circuit may be switched back to the sleep state. In the sleep state, some circuit functions may be turned off, and in the deep sleep state, more circuit functions may be turned off, thus reducing unnecessary power consumption. In the first display mode (for example, 60 Hz mode), as described above, image data may be received and data voltage signals and other driving signals may be provided for the pixel circuits based on the image data, and it is also possible to switch to the second display mode (for example, 1 Hz mode) in response to a relevant switching instruction. In addition, when the image data is no longer displayed or in response to a related instruction, the pixel driving circuit may also be switched back from the first display mode to the sleep state. In the second display mode (for example, 1 Hz mode), as described above, image data may be received and data voltage signals and other driving signals may be provided for the pixel circuits based on the image data, and it is also possible to switch to the first display mode (for example, 1 Hz mode) in response to a relevant switching instruction. In addition, when the image data is no longer displayed or in response to a related instruction, the pixel driving circuit may also be switched back to the sleep state from the second display mode.

As mentioned in the previous embodiments, in the first display mode, in order to provide richer picture details and meet the conventional display requirements, data formats with more significant data bits may be used, such as the 24-bit, 18-bit and 16-bit data formats as described above. In the second display mode, in accordance with its display characteristics, in order to reduce the amount of data and power consumption, data formats with less significant data bits may be used, such as 6-bit and 3-bit data formats as described above. However, in some practical applications, limited by the mainboard speed, there may be a need to use a data format with less significant data bits in the first display mode to avoid lags. Because in general designs, data formats with less significant data bits, such as 6-bit and 3-bit, are generally applied to the second display mode, as described above, in the second display mode, the pixel driving voltage may be finally determined as the maximum driving voltage or the minimum driving voltage according to the value of the most significant data bit. Therefore, in order to reduce the complexity of data processing, when performing the bit complement operation, the zero-padding operation is generally adopted by default. However, in this case, when these data formats with less significant data bits are used in the first display mode, there will be a problem of insufficient pixel brightness.

For example, assuming that in the pixel driving circuit, when the number of significant data bits in pixel data is less than 24 bits, it needs to be complemented to 24 bits. Taking the 18-bit data format as an example, if the significant data bits are R (111111) G (111111) B (111111), if the bits are complemented by padding 0, the data after bit complement will be R (11111100) G (11111100) B (11111100). Then, the corresponding gray scales will be R252 G252 B252 after the D/A module. If the bits are complemented by padding 1, it will be R (11111111) G (11111111) B (11111111), and then the corresponding gray scales will be R255 G255 B255 after the D/A module. Thus, the final maximum gray scale brightness may range between 252~255 through different bit complement ways, and there is basically no brightness difference. Taking the 6-bit data format as an example, when the significant data bits are R (11) G (11) B (11), as a data format with less number of significant data bits, only the zero-padding way is adopted to perform bit complement. That is, the data after bit complement will be R (11000000) G (11000000) B (11000000), and then the corresponding gray scales will be R192 G192 B192 after the D/A module. That is, the maximum gray scale brightness that can be achieved at this time is only a gray scale of 192, and the visual effect brightness is severely insufficient, only 60% of the normal brightness. Similarly, there exists the same problem for the 3-bit data format.

In some embodiments, in order to solve the above-mentioned problem of insufficient brightness, in the first display mode, when the number of significant data bits in the pixel data for the target pixel meets the first preset condition, in response to receiving the enable signal for the low-quality display mode, the low-quality display mode may be used. In the low-quality display mode, in response to the most significant data bit in the pixel data for the target pixel being a first value, the pixel data for the target pixel may be set to a maximum value, and in response to the most significant data bit in the pixel data for the target pixel being a second value, the pixel data for the target pixel may be set to a minimum value. Exemplarily, the first preset condition may be that the number of significant data bits is lower than a preset threshold, or it may be that the number of significant data bits is equal to a preset value. For example, the first preset condition may be that the number of significant data bits is 6, i.e., the 6-bit data format as mentioned above. Alternatively, the first preset condition may be set to other conditions as required. The low-quality display mode may be an independently set display mode, or it may be implemented by directly using the Idle mode of IC. Optionally, when the image data needs to be processed and displayed in cooperation with the low-quality display mode, the low-quality display mode may be enabled by a related enable signal, and the enable signal may be transmitted by means of a separate instruction or CMD information in the image data or by other means. In the low-quality display mode, the pixel data may be reset to the maximum or minimum value only according to the most significant bit value of the pixel data, that is, being set to all 1 or all 0, and the corresponding gray scale is 255 or 0, thus avoiding brightness loss.

Taking the previous example as an example, for the R, G or B sub-pixel in the pixel, the pixel data bits written after bit complement are 8 bits. At this time, the highest bit D7 may be judged. If D7 is 1, the possible data range may be 10000000~11111111, and the corresponding gray scale may be 128~255. Accordingly, the IC displays a gray scale of 255. If D7 is 0, the possible data range may be 00000000~01111111, and the corresponding gray scale may be 0~127. Accordingly, the IC displays 0 gray scale. In this display mode, up to 8 colors may be displayed. However, for the 6-bit data format, 64 colors may be displayed normally. Under normal circumstances, if 8 colors are desired to be displayed, it may be achieved just by a 3-bit data format. Therefore, for achieving the same display effect, the 6-bit data format will increase the data volume of the mainboard. To solve this problem, when writing image data in 6-bit data format in cooperation with the low-quality display mode, the next most significant bit value may be directly made to be equal to the most significant bit value, for example, D6=D7, so as to meet the requirement of low data volume of the mainboard and the requirement of no loss in display brightness.

Figure 11:
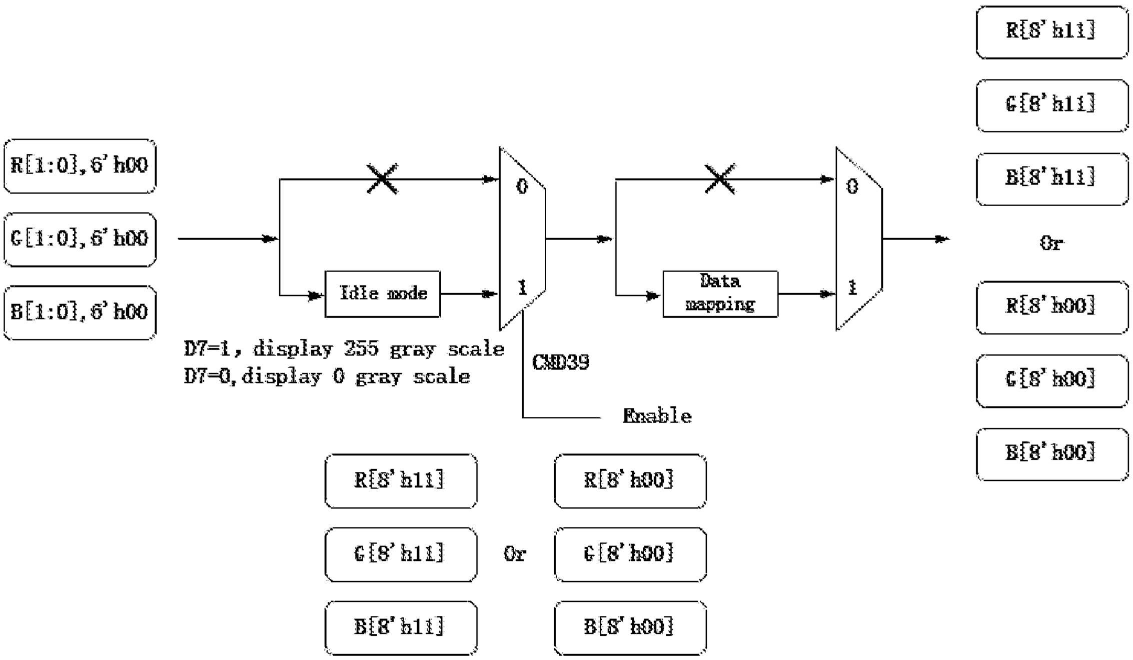
FIG. 11 schematically illustrates an exemplary data processing flow in cooperation with an Idle mode according to some embodiments of the present disclosure.

FIG. 11 schematically illustrates an exemplary process 1100 of data processing in cooperation with the Idle mode. As shown in FIG. 11, when receiving the image data in 6-bit data format, the pixel data of 6-bit significant data bits may be complemented to 24 bits. At this time, for example, in order to reduce the data amount in the mainboard of the driving circuit, D6 may be directly set to be equal to D7. Then, according to the instruction in the CMD information, the Idle mode may be entered by the enable signal. In the Idle mode, according to the value of D7, it is judged whether the gray scale to be displayed by the pixel is 255 or 0, that is, whether to set the pixel data as all 1 or all 0. The set pixel data may pass through the data mapping module and then through the D/A conversion module to generate the corresponding data voltage signal, which may then be provided to the pixel circuit through the branch 610 of the pixel charging circuit as shown in FIG. 6, so that the pixel displays the highest brightness or the lowest brightness.

In some embodiments, in order to solve the above-mentioned problem of insufficient brightness, in the first display mode, when the number of significant data bits in the pixel data for the target pixel meets a second preset condition, the second enable signal may be made valid before the screen is lit. Exemplarily, the second preset condition may be that the number of significant data bits is lower than a preset threshold, or it may be that the number of significant data bits is equal to a preset value. For example, the second preset condition may be that the number of significant data bits is 3, that is, the aforementioned 3-bit data format. Alternatively, the second preset condition may be set to other conditions as required. Normally, after receiving the image data in the first display mode, the corresponding data voltage signals will be generated based on the image data according to the processes as described in the previous embodiments, and the corresponding pixels will be driven by the generated data voltage signals to display an image. In order to solve the problem of brightness loss caused by using a data format such as 3-bit data format in the first display mode, after generating the data voltage signal, it may be switched to the second display mode. That is, the corresponding pixels can be driven through the charging path of the second display mode, and the screen is lit and displays in the second display mode. Since the pixel driving voltage is determined to be the maximum driving voltage or the minimum driving voltage in the second display mode, the pixel will exhibit maximum brightness or minimum brightness without brightness loss. Optionally, after the current image is displayed, it may be switched back to the first display mode to continue receiving image data.

Figure 12:
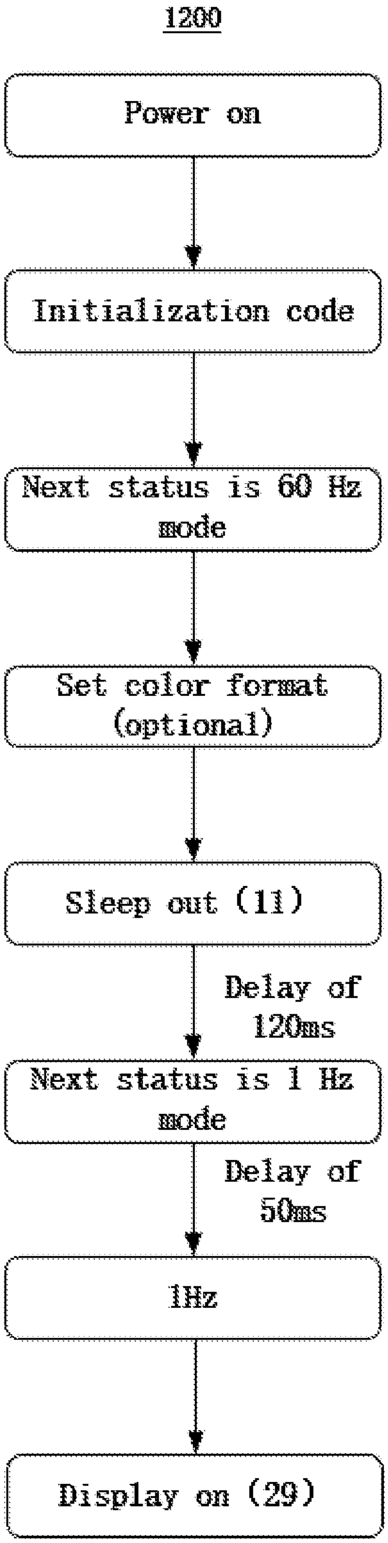
FIG. 12 schematically illustrates an exemplary flowchart of a display flow according to some embodiments of the present disclosure.

FIG. 12 schematically illustrates an exemplary flow 1200 for avoiding the aforementioned problem of brightness loss by means of the second display mode. As shown in the figure, taking 60 Hz mode and 1 Hz mode as an example, after the device is powered on, the circuit may be initialized, and then it is ready to enter 60 Hz mode. In response to receiving relevant display instructions or receiving image data such as in 3-bit data format, the driving circuit may sleep out and start to process the image data, and generate corresponding data voltage signals. After a delay of 120 ms, during which corresponding data processing operations may be completed, it may be switched to 1 Hz mode for lighting the screen to display, thus avoiding the problem of brightness loss when using data formats such as 3-bit at 60 Hz.

In some embodiments, in order to solve the aforementioned problem of insufficient brightness, in the first display mode, when the number of significant data bits in the pixel data for the target pixel meets the third preset condition, the data voltage signal for the target pixel may be adjusted according to the preset binding point voltage, and the preset binding point voltage is used to specify the data voltage signal corresponding to at least one gray scale. As previously analyzed, when a data format with less significant data bits is used in the first display mode, there is brightness loss because the corresponding gray scale of the pixel data after the bit complement cannot reach the maximum gray scale (for example, 255). Therefore, it is possible to adjust some or all of the binding point voltages in the gray-scale to brightness curve (gamma curve) so as to increase the overall brightness within a reasonable range to make up for the aforementioned brightness loss. Optionally, the binding voltage for gamma 255 may be adjusted to improve the brightness. However, due to the adjustable range of the binding point voltage, it cannot be raised indefinitely, so although this method is beneficial to improve the brightness, the improvement effect is often limited. Experiments show that the brightness may be improved from 60% to 80% for the pixel circuits and the pixel driving circuit as mentioned in the embodiments of the present disclosure. Optionally, when this scheme is adopted, the corresponding adjusted preset binding point voltage may be provided while the image data is provided, or the adjusted preset binding point voltage may be stored in the driving circuit and be enabled as required.

Generally speaking, in the related art, the device usually enters the display state after it is powered on and initialization of the internal registers of the driving circuit is completed. However, as described above, in some embodiments of the present disclosure, the driving of the pixel circuit includes an initialization stage and a display stage. When the system completes the initialization of the driving circuit and drives and initialize the display screen with random signals, the displayed image on the display screen will appear as a blurred screen, that is, there appears the problem of snowflake after power-on. This will detract from the user's experience. In some embodiments, to improve this problem, after the device is powered on and initialized, and before the screen is lit, initialization image data may be received, and the initialization voltage signal for each pixel may be determined based on the initialization image data. Optionally, the initialization image data may be separate initialization image data, or may be the image data of the first frame in the normally received image data.

Figure 13:
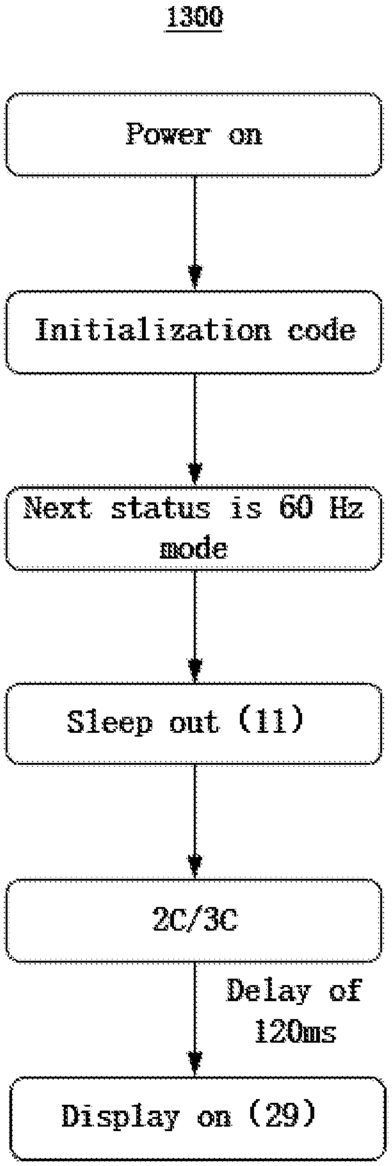
FIG. 13 schematically illustrates an exemplary flowchart of a display flow according to some embodiments of the present disclosure.

FIG. 13 schematically illustrates an exemplary flow 1300 to be adopted to avoid the problem of snowflake after power-on. As shown in the figure, after the device is powered on, the circuit of the device may be initialized by the initialization code, and then it may be ready to enter the 60 Hz mode. After sleeping out and receiving the image data (2C/3C), the screen may be lit to display after 120 ms. During the 120 ms, the corresponding data voltage signals may be generated based on the image data and provided to the corresponding pixels to prepare for the display of the corresponding image.

As mentioned above, in some embodiments of the present disclosure, various data formats such as 24-bit, 28-bit, 16-bit, 6-bit, 3-bit, etc. may be supported. For different data formats, since the corresponding numbers of bits are different, under the same resolution, for a frame of image, the overall data transmission volume will be different, and the transmission time will be different under the same transmission rate. Specifically, the data transmission amount is directly proportional to the resolution and the number of bits in a data format, while the overall data transmission rate (that is, the data writing rate) depends on the speed of the data interface and it is inversely proportional to the time required for the interface to transmit 1-bit data. Therefore, the writing rate of image data may be F=1-bit transmission time*the number of bits in the data format*X*Y (wherein X and Y are the resolution). Therefore, for the data formats with more bits, when the transmission rate of the data interface is low, the fluency degree for picture refreshing will be affected and lags will be caused for the picture. For the data formats with less bits, when the transmission rate of data interface is high, it will not affect the display effect, but it will cause redundant consumption of interface resources and interface power consumption, which is not conducive to the overall power consumption control of the device.

To avoid the above problems, in some embodiments, a first interface and a second interface with different data transmission rates may be provided in the driving circuit, and the first interface or the second interface may be selected to receive the image data based on the display mode and/or the number of significant data bits in the pixel data according to a preset interface rule. For example, the preset interface rule may specify to use which interface under which circumstance. For example, the first interface with a higher transmission rate may be used when the number of significant data bits in pixel data is higher than a certain threshold, and the second interface with a lower transmission rate may be used when the number of significant data bits is lower than the threshold. Alternatively, as mentioned above, the first display mode may be usually used for general display requirements, while the second display mode may be usually used for displaying static images or low-frequency refreshing images, so it is also possible to set that the first interface may be used in the first display mode and the second interface may be used in the second mode. Alternatively, both may be considered to choose an appropriate interface, and so on. Exemplarily, the first interface may be, for example, an MIPI interface, with a rate of hundreds of Mbps to 1 Gbps, and the second interface may be, for example, an SPI interface, with a rate of tens of Mbps. Alternatively, other combinations of interfaces may be chosen according to specific application requirements, or more than two interfaces for selecting may be provided.

Figure 14:
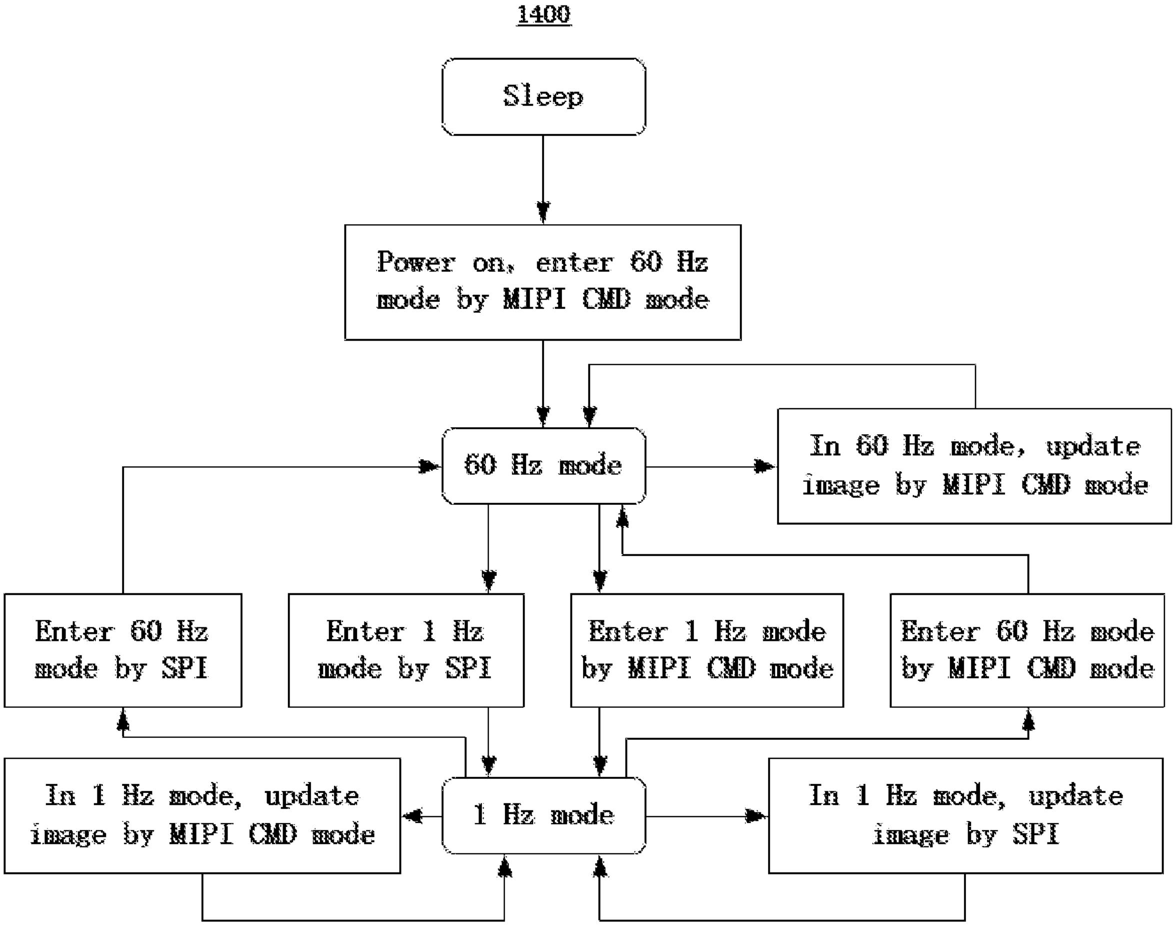
FIG. 14 schematically illustrates an exemplary internal mode switching diagram in cooperation with interfaces according to some embodiments of the present disclosure.

FIG. 14 schematically illustrates an exemplary state switching flow 1400 through different interfaces. As shown in the figure, in the sleep state, it may enter 60 Hz mode through the CMD mode of the MIPI interface. The MIPI interface may support CMD mode and VIDEO mode. In the CMD mode, the system side may send commands, parameters and data to the pixel driving circuit in the form of CMD+DATA to control the behavior of the pixel driving circuit. In the VIDEO mode, the system side may send data to the pixel driving circuit in the form of a real-time pixel stream. In the 60 Hz mode, the image may be updated through the CMD mode of the MIPI interface, and it may enter 1 Hz mode through the MIPI interface or the SPI interface. In the 1 Hz mode, it may enter 60 Hz mode through the MIPI interface or the SPI interface, and the image data may be updated through the MIPI interface or the SPI interface.

FIG. 15 schematically illustrates an application recommendation table 1500 for the MIPI interface and the SPI interface. As shown in the table, VIDEO or CMD mode may be applied to the MIPI interface, which may be used for various data formats in 60 Hz and 1 Hz modes. As for the SPI interface (taking SPI4 W interface as an example here), CMD mode may be applied, which may be used for data formats in 1 Hz mode, and for 60 Hz mode, it may be used for various data formats. But it is not recommended for ordinary 3-bit or 6-bit data format due to large brightness loss. For 6-bit data format used in conjunction with Idle mode, it may be used under the condition that the mainboard supports sending 3-bit data in 2-2-2 format. For the 3-bit data format used in conjunction with Gamma binding point voltage adjustment, the brightness may be increased to 80%, and it may be used under some conditions (for example, under the condition that the requirement for brightness is not high, etc.).

According to some embodiments of the present disclosure, a pixel driving circuit is also provided. FIG. 16 schematically illustrates an exemplary block diagram of a pixel driving circuit 1600. As shown, the pixel driving circuit 1600 may include a data interface 1610, a data processing circuit 1620 and a pixel charging circuit 1630.

Specifically, the data interface 1610 may be configured to receive image data including pixel data for at least one pixel. The data processing circuit 1620 may be configured to determine a data voltage signal for a target pixel based on pixel data for the target pixel in the image data. The pixel charging circuit 1630 may include a first charging circuit and a second charging circuit. The first charging circuit may be configured to drive the target pixel in a first display mode in response to a first enable signal being valid. In the first display mode, the data voltage signal is updated at a first frequency, and the data voltage signal is provided for the target pixel so that the driving voltage of the target pixel may be determined as a voltage difference between the data voltage signal and a common voltage signal, wherein the common voltage signal is a reference voltage signal common to all pixels. The second charging circuit may be configured to drive the target pixel in a second display mode in response to a second enable signal being valid. In the second display mode, the data voltage signal is updated at a second frequency, and the data voltage signal is adjusted according to the pixel data for the target pixel, and the adjusted data voltage signal is provided for the target pixel, so that the driving voltage of the target pixel may be determined as the maximum driving voltage or the minimum driving voltage, wherein the second frequency is lower than the first frequency. Exemplarily, the first charging circuit and the second charging circuit may be respectively as the charging path 610 and the charging path 620 as shown in FIG. 6, or may take other similar forms.

In some embodiments, the pixel data for the target pixel may include at least one significant data bit. And the second charging circuit may include a latch, which is configured to latch the most significant data bit among the at least one significant data bit; a mode selection circuit, which is configured to, in response to the most significant data bit in the at least one significant data bit being a first value, adjust the data voltage signal so that the driving voltage of the target pixel is determined as the maximum driving voltage, and, in response to the most significant data bit in the at least one significant data bit being a second value, adjust the data voltage signal so that the driving voltage of the target pixel is determined as the minimum driving voltage.

In some embodiments, the data processing circuit includes: a buffer circuit, which is configured to buffer the pixel data for a preset number of pixels in the image data; a digital-to-analog conversion circuit, which is configured to convert the pixel data for the target pixel in the buffered pixel data into the data voltage signal for the target pixel.

In some embodiments, the pixel driving circuit further includes a data voltage buffer, which is configured to buffer the data voltage signal in the second display mode. For example, in the second display mode, when new image data is received, the data voltage buffer may be opened and the data voltage signal generated based on the new image data may be written into it. When an instruction to switch to the first display mode is received, the data voltage buffer may be opened and the data voltage signal may be written into it. This has been described in the previous embodiments and will not be repeated here.

It should be understood that the pixel driving circuit 1600 may have same or similar embodiments and advantages as the pixel driving method 100 as described above, and will not be repeated in detail here.

Figure 17A:
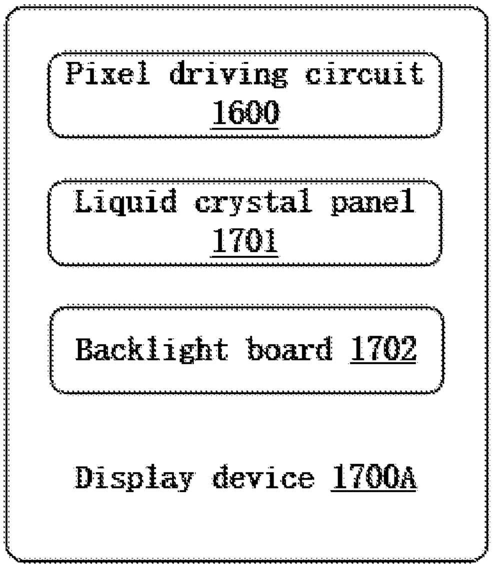
FIG. 17A schematically illustrates an exemplary block diagram of a display device according to some embodiments of the present disclosure.

According to some embodiments of the present disclosure, there is also provided a display device, which may include: a pixel driving circuit 1600; a liquid crystal panel including a plurality of pixels and configured to receive the data voltage signal from the pixel driving circuit; a backlight board configured to provide backlight for the liquid crystal panel. FIG. 17A schematically illustrates an exemplary block diagram of a display device 1700A according to some embodiments of the present disclosure. As shown in FIG. 17A, the display device 1700A may include a pixel driving circuit 1600, a liquid crystal panel 1701 and a backlight board 1702. Exemplarily, the liquid crystal panel 1701 may include a color film substrate, an array substrate and a liquid crystal layer therebetween. For each pixel unit, the deflection degree of liquid crystal molecules may be controlled by applying an electric field by the array substrate, thereby displaying corresponding brightness. Optionally, the backlight board 1702 may adopt various types of direct or side-emitting backlight structure, which is not specifically limited by the disclosure.

Figure 17B:
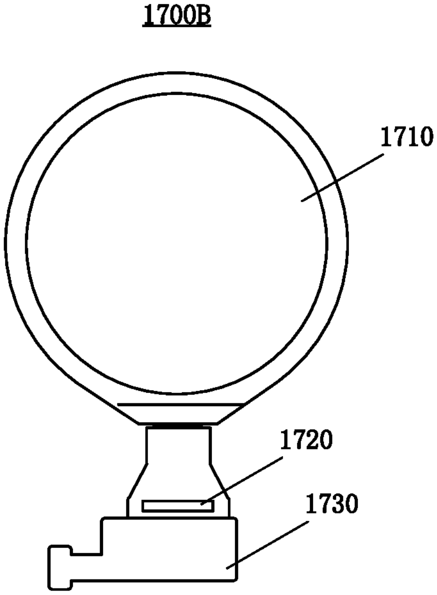
FIG. 17B exemplarily illustrates a schematic diagram of a display device according to some embodiments of the present disclosure.

Exemplarily, FIG. 17B illustrates a schematic diagram of a display device 1700B according to some embodiments of the present disclosure. As shown, the display device 1700B may include a liquid crystal panel 1710 and a pixel driving circuit 1720. The backlight board may be located below the liquid crystal panel 1710, which is not shown in FIG. 17B. Optionally, the pixel driving circuit provided by the present disclosure may also be applied to other suitable types of display devices besides liquid crystal display devices. The pixel driving circuit 1720 may be the pixel driving circuit as described in any of the previous embodiments, and may execute the pixel driving method as described in any of the previous embodiments to drive the display screen 1710. The pixel driving circuit 1720 may be implemented in the form of e.g. a driving IC, and may be fixed on the circuit board 1730. Exemplarily, the circuit board 1730 may be a general printed circuit board (PCB) or a flexible printed circuit board (FPC). The driving IC may be fixed on the circuit board 1730 by COF (Chip On Film) or other technologies.

Furthermore, according to some embodiments of the present disclosure, there is also provided a computing device, which may include the pixel driving circuit 1600.

Figure 18:
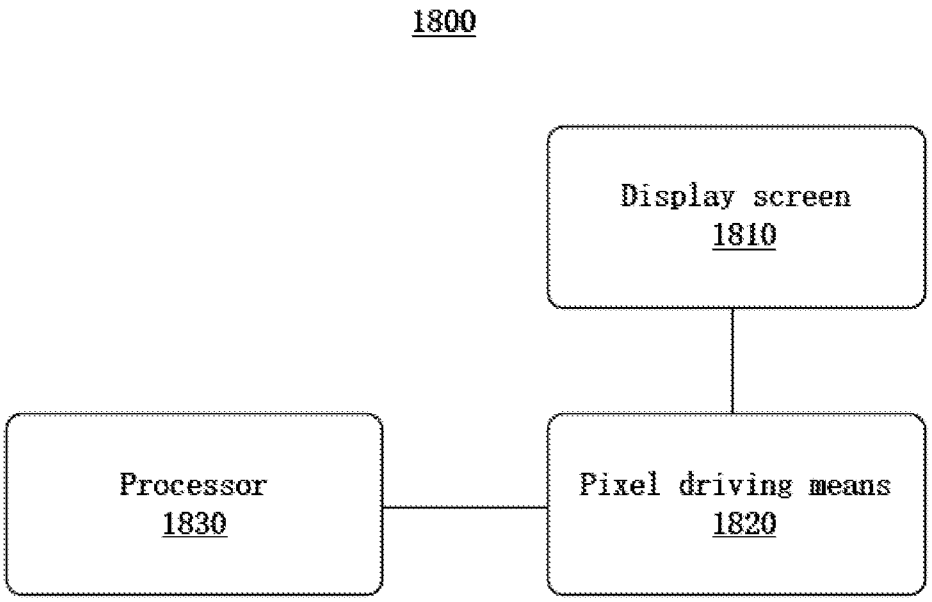
FIG. 18 schematically illustrates an exemplary block diagram of a computing device according to some embodiments of the present disclosure.

Exemplarily, FIG. 18 schematically illustrates an exemplary block diagram of a computing device 1800 according to some embodiments of the present disclosure. As shown, the computing device 1800 may include a display screen 1810, a pixel driving means 1820, and a processor 1830. For example, the pixel driving means 1820 may receive various instructions and data related to display from the processor through appropriate interfaces, and provide data voltage signals to the pixels in the display screen based on these instructions and data, so as to drive the corresponding pixels to display corresponding brightness. The pixel driving means 1820 may be the pixel driving circuit as described in any of the aforementioned embodiments, and may execute the pixel driving method as described in any of the aforementioned embodiments. The display screen 1810 may be, for example, an LCD (Liquid Crystal Display) or other types of display screens. The processor 1830 may be a CPU (central processing unit), an MCU (Microcontroller Unit) or other processors.

It should be understood that the above-mentioned display device and computing device may also have the same or similar embodiments and advantages as the pixel driving method 100 as described above, and will not be repeated here.

The above is only specific embodiments of the present disclosure, but the scope of protection of the present disclosure is not limited thereto. Any changes or substitutions within the technical scope disclosed in the disclosure that are easily conceived by the ordinary skilled person in the art should be covered by the protection scope of the disclosure. Therefore, the protection scope of the present disclosure should be defined by the protection scope of the claims. Furthermore, in the claims, the word "comprising" does not exclude other elements or steps, and "a" or "an" does not exclude a plurality. The mere fact that certain measures are recited in mutually different dependent claims does not indicate that a combination of these measures cannot be used for advantages.

What is claimed is:

1. A pixel driving method, comprising:

receiving image data comprising pixel data for at least one pixel;

determining a data voltage signal for a target pixel based on pixel data for the target pixel in the image data;

in response to a first enable signal being valid, driving the target pixel in a first display mode, in which operations are performed which comprise updating the data voltage signal at a first frequency and providing the data voltage signal for the target pixel so that a driving voltage of the target pixel is determined as a voltage difference between the data voltage signal and a common voltage signal, wherein the common voltage signal is a reference voltage signal common to all pixels;

in response to a second enable signal being valid, driving the target pixel in a second display mode, in which operations are performed which comprise updating the data voltage signal at a second frequency, adjusting the data voltage signal according to the pixel data for the target pixel, and providing the adjusted data voltage signal for the target pixel so that the driving voltage of the target pixel is determined as a maximum driving voltage or a minimum driving voltage, wherein the second frequency is lower than the first frequency.

2. The method according to claim 1, wherein the pixel data for the target pixel comprises at least one significant data bit, and wherein the adjusting the data voltage signal according to the pixel data for the target pixel, and providing the adjusted data voltage signal for the target pixel so that the driving voltage of the target pixel is determined as a maximum driving voltage or a minimum driving voltage comprises:

in response to a most significant data bit in the at least one significant data bit being a first value, adjusting the data voltage signal so that the driving voltage of the target pixel is determined as the maximum driving voltage;

in response to the most significant data bit in the at least one significant data bit being a second value, adjusting the data voltage signal so that the driving voltage of the target pixel is determined as the minimum driving voltage.

3. The method according to claim 2, wherein the adjusting the data voltage signal so that the driving voltage of the target pixel is determined as the maximum driving voltage comprises:

during an initialization period, determining the data voltage signal as a first voltage signal and providing valid initialization control signals for pixels in turn;

during a display period, determining the data voltage signal as opposite to the common voltage signal, and providing a continuously valid display control signal for the target pixel, so that the driving voltage of the target pixel is determined as a voltage difference between the data voltage signal and the common voltage signal.

4. The method according to claim 2, wherein the adjusting the data voltage signal so that the driving voltage of the target pixel is determined as the minimum driving voltage comprises:

during an initialization period, determining the data voltage signal as a second voltage signal, and providing valid initialization control signals for pixels in turn;

during a display period, providing a zero-difference voltage signal for the target pixel, wherein the zero-difference voltage signal is the same as the common voltage signal, and providing a continuously valid display control signal for the target pixel, so that the driving voltage of the target pixel is determined as a voltage difference between the zero-difference voltage signal and the common voltage signal.

5. The method according to claim 1, wherein the determining a data voltage signal for a target pixel based on pixel data for the target pixel in the image data comprises: buffering pixel data for a preset number of pixels in the image data;

according to a preset digital-to-analog conversion rule, converting the pixel data for the target pixel in the buffered pixel data into the data voltage signal for the target pixel.

6. The method according to claim 5, wherein the buffering pixel data for a preset number of pixels in the image data comprises:

in response to a number of significant data bits in the pixel data for the preset number of pixels being greater than a first threshold, compressing the pixel data for the preset number of pixels according to a preset compression rule so that a number of significant data bits in the compressed pixel data is not greater than the first threshold.

7. The method according to claim 6, wherein converting the pixel data for the target pixel in the buffered pixel data into the data voltage signal for the target pixel comprises:

decompressing the compressed pixel data;

converting the pixel data for the target pixel in the decompressed pixel data into the data voltage signal for the target pixel.

8. The method according to claim 5, wherein the buffering pixel data for a preset number of pixels in the image data comprises:

in response to a number of significant data bits in the pixel data for the preset number of pixels being less than a first threshold, complementing the pixel data for the preset number of pixels according to a first preset bit complement rule, so that a number of significant data bits in the complemented pixel data is equal to the first threshold.

9. The method according to claim 8, wherein the converting the pixel data for the target pixel in the buffered pixel data into the data voltage signal for the target pixel comprises:

in response to a number of significant data bits in pixel data for a target pixel electrode being less than a second threshold, complementing the pixel data for the target pixel electrode according to a second preset bit complement rule, so that a number of significant data bits in the complemented pixel data is equal to the second threshold.

10. The method according to claim 9, wherein the converting the pixel data for the target pixel in the buffered pixel data into the data voltage signal for the target pixel further comprises:

in response to receiving pixel data for at least two pixels every clock cycle, redistributing the pixel data for the at least two pixels into at least two groups of pixel data for different pixels.

11. The method of claim 1, further comprising:

in the first display mode, in response to receiving an instruction to switch to the second display mode, writing enabling data for the second display mode into a mode register, and after a first preset time interval, making the second enable signal valid based on the enabling data in the mode register.

12. The method of claim 1, further comprising:

in the second display mode, in response to receiving new image data, opening a data voltage buffer;

writing a data voltage signal determined based on the new image data into the data voltage buffer;

closing the data voltage buffer after a second preset time interval.

13. The method of claim 1, further comprising:

in the second display mode, in response to receiving an instruction to switch to the first display mode, writing enabling data for the first display mode into a mode register and opening a data voltage buffer;

writing a data voltage signal into the data voltage buffer;

closing the data voltage buffer after a third preset time interval;

making the first enable signal valid based on the enabling data in the mode register.

14. The method according to claim 1, further comprising: in the first display mode, when a number of significant data bits in the pixel data for the target pixel meets a first preset condition, in response to receiving an enable signal for a low-quality display mode, using the low-quality display mode, wherein in the low-quality display mode, in response to the most significant data bit in the pixel data for the target pixel being a first value, setting the pixel data for the target pixel as a maximum value, and, in response to the most significant data bit in the pixel data for the target pixel being a second value, setting the pixel data for the target pixel as a minimum value.

15. The method according to claim 1, further comprising: in the first display mode, when a number of significant data bits in the pixel data for the target pixel meets a second preset condition, making the second enable signal valid before a screen is lit.

16. The method according to claim 1, further comprising: in the first display mode, when a number of significant data bits in the pixel data for the target pixel meets a third preset condition, adjusting the data voltage signal for the target pixel according to a preset binding point voltage, wherein the preset binding point voltage is used for specifying the data voltage signal corresponding to at least one gray scale.

17. The method according to claim 1, wherein the receiving image data comprises:

after a device is powered on and initialized, and before a screen is lit, receiving initialization image data, and determining initialization voltage signals for pixels based on the initialization image data.

18. The method according to claim 1, wherein the receiving image data comprises:

according to a preset interface rule, selecting a first interface or a second interface to receive the image data based on the display mode and/or the number of significant data bits in the pixel data, wherein the first interface and the second interface have different data transmission rates.

19. A pixel driving circuit comprising:

a data interface configured to receive image data including pixel data for at least one pixel;

a data processing circuit configured to determine a data voltage signal for a target pixel based on pixel data for the target pixel in the image data;

a pixel electrode driving circuit comprising a first charging circuit and a second charging circuit, wherein the first charging circuit is configured to, in response to a first enable signal being valid, drive the target pixel in a first display mode, in which operations are performed which comprise updating the data voltage signal at a first frequency, and providing the data voltage signal for the target pixel so that a driving voltage of the target pixel is determined as a voltage difference between the data voltage signal and a common voltage signal, wherein the common voltage signal is a reference voltage signal common to all pixels, and wherein the second charging circuit is configured to, in response to a second enable signal being valid, drive the target pixel in a second display mode, in which operations are performed which comprise updating the data voltage signal at a second frequency, adjusting the data voltage signal according to pixel data for the target pixel, and providing the adjusted data voltage signal for the target pixel so that a driving voltage of the target pixel is determined as a maximum driving voltage or a minimum driving voltage, wherein the second frequency is lower than the first frequency.

20. The pixel driving circuit according to claim 19, wherein the pixel data for the target pixel comprises at least one significant data bit, and wherein the second charging circuit comprises:

a latch configured to latch a most significant data bit in the at least one significant data bit;

a mode selection circuit configured to, in response to the most significant data bit in the at least one significant data bit being a first value, adjust the data voltage signal so that a driving voltage of the target pixel is determined as the maximum driving voltage, and, in response to the most significant data bit in the at least one significant data bit being a second value, adjust the data voltage signal so that the driving voltage of the target pixel is determined as the minimum driving voltage.

21. The pixel driving circuit according to claim 19, wherein the data processing circuit comprises:

a buffer circuit configured to buffer pixel data for a preset number of pixels in the image data;

a digital-to-analog conversion circuit configured to convert pixel data for the target pixel in the buffered pixel data into the data voltage signal for the target pixel.

22. The pixel driving circuit according to claim 19, further comprising a data voltage buffer configured to buffer the data voltage signal in the second display mode.

23. A display device, comprising:

the pixel driving circuit according to claim 19;

a liquid crystal panel comprising a plurality of pixels and configured to receive data voltage signals from the pixel driving circuit;

a backlight panel configured to provide backlight for the liquid crystal panel.

* * * * *